US005555408A

United States Patent [19]

Fujisawa et al.

[11] Patent Number: 5,555,408

[45] **Date of Patent: *Sep. 10, 1996**

[54] KNOWLEDGE BASED INFORMATION RETRIEVAL SYSTEM

[75] Inventors: Hiromichi Fujisawa, Tokorozawa, Japan; David Cohn, Seattle, Wash.; Atsushi Hatakeyama, Kokubunji; Itsuko Kiuchi, Tokyo, both of Japan

[73] Assignee: Hitachi, Ltd., Tokyo, Japan

[ * ] Notice: The term of this patent shall not extend beyond the expiration date of Pat. No. 5,404,506.

[21] Appl. No.: 141,039

[22] Filed: Oct. 25, 1993

Related U.S. Application Data

[63] Continuation of Ser. No. 831,093, Feb. 10, 1992, which is a continuation of Ser. No. 276,384, Nov. 25, 1988, abandoned, which is a continuation-in-part of Ser. No. 844,123, Mar. 26, 1986, Pat. No. 4,868,733.

[30] Foreign Application Priority Data

| | | | |
|---|---|---|---|
| Nov. 27, 1987 | [JP] | Japan | 62-297568 |
| Jan. 11, 1988 | [JP] | Japan | 63-2609 |

[51] Int. Cl.[6] .......... G06F 17/30

[52] U.S. Cl. .......... 395/600

[58] Field of Search .......... 395/650, 700, 395/600, 54, 60

[56] References Cited

U.S. PATENT DOCUMENTS

| | | | |
|---|---|---|---|
| 4,837,689 | 6/1989 | Tanaka et al. | 395/54 |
| 4,914,590 | 4/1990 | Loatman et al. | 364/419 |
| 5,228,116 | 7/1993 | Harris et al. | 395/600 |

OTHER PUBLICATIONS

*First International Workshop on Expert Database Systems*, "Interactive Classification as a Knowledge Acquisition Tool", T. Finin, et al., Oct. 27, 1994, Kiawah Island, South Carolina.

*IEEE Transactions On Software Engineering*, "Knowledge Representation for Model Management System", D. R. Dolk, et al., vol. SE-10, No. 6, Nov. 6, 1984, New York, New York.

*Proceedings of National Conference of AAAI*, "Rabbit: An Intelligent Database Assistant", F. N. Tou, et al., 1982.

*Proceedings of the 1984 AFIPS National Computer Conference*, "Menu-Based Natural Language Understanding", H. Tennant, Jul. 12, 1984, Las Vegas, Nevada.

*Primary Examiner*—Thomas M. Heckler
*Assistant Examiner*—John Q. Chavis
*Attorney, Agent, or Firm*—Antonelli, Terry, Stout & Kraus

[57] ABSTRACT

An information retrieval system with good human-interface methods to give the system ease-of-use having two distinctive features with the first being visual interface and the second being natural language interpretation. The visual interface provides for one is visual interaction for local search and natural language interpretation provides for linguistic interaction for global search. The visual interface provides versatile views onto the contents of the knowledge base that the system has, controlling mechanisms for browsing through the knowledge base, a capability of showing relevant information for the users, and a mechanism for editing a query expression that describes information to retrieve. By using the visual interface for information retrieval, the users can easily create query expressions, by consulting and reacting with the system. The natural language interpretation makes use of a conceptual network as a knowledge-base that stores important concepts and relationships among these concepts. Based on knowledge and information represented in the conceptual network, the meaning of a noun phrase or a nominal compound which is a string of adjectives and nouns with some prepositions can be inferred. The inferred interpretation of such a noun phrase is paraphrased into an expression that the information retrieval system can handle. Therefore, the user of the system can simply describe the desired information in a language to get the desired information.

38 Claims, 33 Drawing Sheets

| C# | CNAME | LANG |
|---|---|---|
| C#0000 | UNIVERSAL | E |
| C#0000 | 全世界 | J |
| C#0001 | THING | E |
| C#0001 | 事物 | J |
| C#0002 | PAPER MATERIAL | E |
| C#0002 | 書物 | J |
| C#0003 | LIVING THING | E |
| C#0003 | 生物 | J |
| C#0004 | BOOK | E |
| C#0004 | 本 | J |
| C#0005 | PERSON | E |
| C#0005 | 人 | J |
| C#0006 | BOOK# 0051 | E |
| C#0006 | BOOK# 0051 | J |
| C#0007 | NEWTON | E |
| C#0007 | ニュートン | J |

| C# (232) | SC# (233) |
|---|---|
| C# 0001 | C# 0000 |
| C# 0002 | C# 0001 |
| C# 0003 | C# 0001 |
| C# 0004 | C# 0002 |
| C# 0005 | C# 0003 |
| C# 0006 | C# 0004 |
| C# 0007 | C# 0005 |

| RS# | RSNAME | LR | RL | LANG |
|---|---|---|---|---|
| RS#0001 | AUTHORSHIP | author - is<br>by<br>from<br>of | is-author - of<br>is-the-author-of<br>wrote<br>has-written | E |
| RS#0001 | 著者 | の著者である<br>を書いた | が著者である<br>が書いた<br>による | J |

| R# | RS# | C#L | C#R | CLASS |
|---|---|---|---|---|
| R# 0001 | RS# 0001 | C# 0004 | C# 0005 | GR |
| R# 0002 | RS# 0001 | C# 0006 | C# 0007 | INST |

| PREP | RS#-LR | RS#-RL |
|---|---|---|
| at | RS#0123 | RS#0209 |
| | RS#1054 | |
| | RS#2103 | |
| by | ⋮ | |
| from | | |
| in | | |
| of | | |
| on | | |

| LINK | RS# | DIR |
|---|---|---|
| author-is | RS#0001 | LR |
| is-author-of | RS#0001 | RL |
| is-the-author-of | RS#0001 | RL |
| has-written | RS#0001 | RL |

KNOWLEDGE BASED INFORMATION RETRIEVAL SYSTEM

This is a continuation of application Ser. No. 07/831,093, filed Feb. 10, 1992, which is a continuation of application Ser. No. 07/276,384 filed on Nov. 25, 1988, now abandoned, which is a Continuation-In-Part of application Ser. No. 06/844,123, filed Mar. 26, 1986 which issued as U.S. Pat. No. 4,868,733.

BACKGROUND OF THE INVENTION

This invention relates to knowledge based information retrieval system and in particular to a human interface of an intellectual query system permitting the end user to query efficiently information stored in a network structure in an electronic file.

This interface can be divided into the natural language interface and the visual interface. The natural language interface is suitable for a global search, by which the search is effected by deduction from the natural language and the visual interface is suitable for a search from a domain, which can be seen by eyes, i.e. for a local search.

Heretofore, as a human interface using the natural language, there is known a natural language interface for the database. Therefor there are references, G. G. Hendrix et al., "Developing a Natural Language Interface to Complex Data", ACM Trans Database Systems, Vol. 3, 1978, pp. 105–147, etc. In these systems a data model for the database (method, by which the relation between different data items, which are to be memorized, is expressed) and a grammar and a dictionary for interpreting the natural language are set independently. That is, when the natural language interface is added to an existing database, it is necessary to construct newly a grammar and a dictionary. Or it has a problematical point that it is necessary to modify the grammar and the dictionary for the natural language interface, when the object database is changed.

Further, heretofore, a database, to which the natural language interface is given, is a relational database and the formal language for the search used therefor, i.e. a quasi-standardized SQL (Structural Query Language), is weak in the capability for describing high order knowledge. Since a query expression by the natural language is translated usually into a formal language as such an intermediate language, it has a problematical point that the function of the whole system is restricted by the expressing capacity of this formal language. In particular, although the relational database is useful for uniform data, it cannot be said that it is satisfactorily suitable for a heterogeneous database, by which various kinds of matters are dealt with, or an object-oriented database. For example, it is not suitable for describing a matter, based on ambiguous memory of a user, and querying information concerning it, based on that description.

Further, in these systems means other than the natural language is used for inputting data (new knowledge and information) and the data input is carried out by a specialist. Consequently there is a problem that it is difficult for an end user to input and register directly the data.

Furthermore, as small scale and large capacity memory devices such as optical disk storage units have been realized, document filing devices directed to offices, for which the end user operates directly the processing of supervision and search of the database, capable of storing and querying a large amount of information, which has been effected heretofore by a specialist, have been realized.

As a method for facilitating memory and search of information in such a filing device, e.g. JP-A-61-220027 can be referred to. This literature discloses an information querying method enabling the end user to query easily desired documents etc. from ambiguous and fragmental information and at the same time to facilitate their registration. However, by this method, it is very difficult to form query conditions, under which information required by the user can be appropriately taken out, when the query conditions for effecting the query from the knowledge base are formed.

SUMMARY OF THE INVENTION

A first object of this invention is to solve the problematical points as described above and to enable the end user to query desired information from a description by a natural language even on the basis of fragmental memory. Furthermore it is to enable the user itself to register new information and knowledge similarly by using the natural language.

A second object of this invention is to provide a system, by which the user finds a concept, which he seeks, without any feeling that he is querying, by facilitating modification of concept in query expressions, enabling him to modify the object to be queried, to query one after another even in the course of formation of query expressions and to query locally the query expressions.

In order to achieve the above first object, this invention is characterized in that a common knowledge expression base is given to the knowledge base and the natural language interface so that the query and the registration of knowledge and information can be effected by using the natural language.

Concretely speaking, this invention gives a knowledge representation method (corresponding to a data model in the data base) called "concept relation model" expressing a system of matters and the fact with "concept" and "relation" as a method for constructing the knowledge base, and further provides a method, by which knowledge of language can be memorized also in the knowledge base. Here a "concept" means a "data item" in a computer representing matters, events or abstract concept and a "relation" means a "data item" defined between different concepts. The concept can be represented by a node (apex) and the relation can be represented by a link (side). Knowledge represented by a concept relation model constitutes therefore a network of concepts. Here this is called a conceptual network.

That is, the knowledge base according to this invention is characterized in that the knowledge, which is originally desired to be stored, is stored in the conceptual network as one body together with the knowledge for expressing it by using a language and that the natural language interface uses the same knowledge in common. Consequently, in principle it is not necessary to construct newly a dictionary, etc. for the natural language interface.

Further this invention provides a natural language understanding method, by which the meaning of a query expression expressed by a natural language is interpreted by effecting deduction from the matters, etc. stored in the knowledge base. In particular, it gives a method for interpreting the meaning of nominal compounds consisting of a plurality of series of nouns, which we use frequently. In order to interpret the meaning of the nominal compounds, it is necessary that the system deduces relations between different nouns and this invention gives a method, by which only significant relations are deducted from the concepts and the relations stored in the knowledge base.

Furthermore, the knowledge representation method according to this invention restricts the part depending on the language so as to facilitate the application to a plurality of languages. In addition, it makes the coexistence of expressions by different languages possible. Consequently this invention provides a method, by which it is possible to query and register information in e.g. both English and Japanese in a same knowledge base.

In order to achieve the above second object, according to this invention, display of a superconcept of a current concept in a query expression together with the query expression and a network display from the current concept and changeable superconcepts to subconcepts satisfying conditions added to the current concept are effected by utilizing multiple-window functions. Further the object can be achieved by the fact that displacement of the current concept due to shifting between different concepts in the query expression, modification of the current concept within concepts satisfying the added conditions, addition of restrictions to the current concept, addition of a root and query of concepts satisfying the added conditions can be always executed.

BRIEF DESCRIPTION OF THE DRAWINGS

FIG. 3 is a scheme indicating names of concept, FIG. 3 and the followings being schemes illustrating the knowledge memory according to the same model;

FIG. 4 is a scheme indicating subsumption relations;

FIG. 5 is a scheme indicating the generic relationship definition;

FIG. 6 is a scheme indicating the relations;

FIG. 12 is a table indicating prepositions;

FIG. 13 is a table indicating relational descriptor;

DESCRIPTION OF THE PREFERRED EMBODIMENTS

Hereinbelow a concrete embodiment of this invention will be explained. At first an embodiment concerning the natural language interface will be described.

Figure 2:
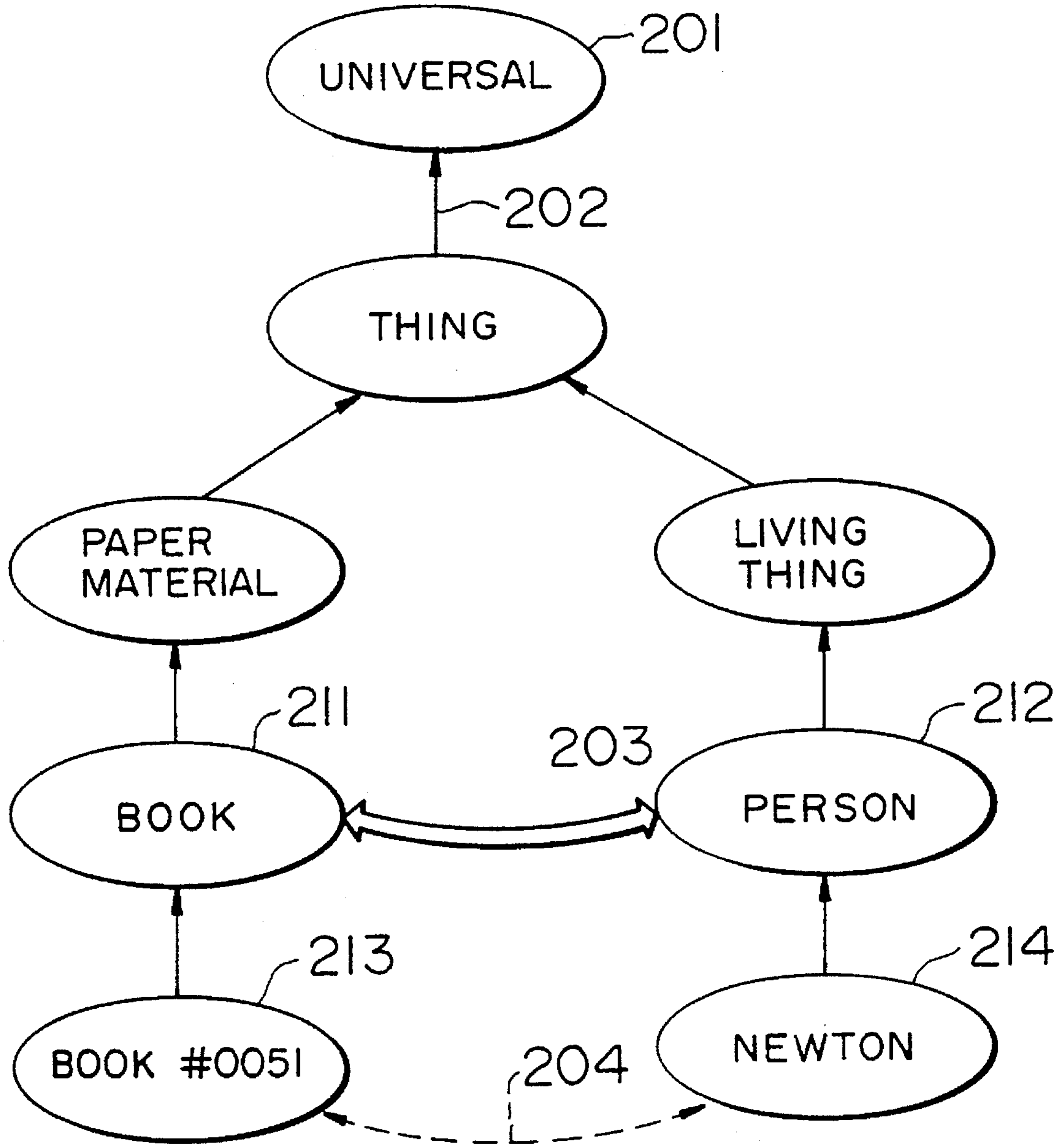
FIG. 2 is a scheme of a concept network for explaining a knowledge expressing method according to the concept relation model.

At first the fundamental principle of this embodiment will be explained. The knowledge expressing method by using the concept relation model serving as the base of this invention will be explained. FIG. 2 indicates a part of a conceptual network. In the figure ellipses represent concepts (nodes) and arrows represent relations (links). A node 201 "UNIVERSAL" is a root node representing all within the knowledge base. For each of the nodes it is possible to define more than one series of letters as the name of the relevant concept. For example a synonym or a corresponding word in a foreign language can be added thereto.

On the other hand, in the links connecting different nodes there are subsumption relations (IS-A link 202) defined between two nodes, between which a property is inherited, "generic relationships" (link 203) defined generally between different concepts, and "instance relations" (link 204) as concrete examples of the same generic relationships. The subsumption relation represents the class of matters. Consequently the conceptual network consisting of the concepts and the subsumption relations constitutes a conceptual tree representing a taxonomic hierarchy.

For example the conceptual tree within the conceptual network indicated in FIG. 2 represents the following knowledges;

(PAPER-MATERIAL (is-a THING))
(BOOK (is-a PAPER-MATERIAL))
(BOOK#0051 (is-a BOOK))
(LIVING-THING (is-a THING))
(PERSON (is-a LIVING-THING))
(NEWTON (is-a PERSON))

These are called frame expressions. These are expressed by the symbolic expression used for the LISP language. These can be expressed also in usual English and written as follows;

Paper material is a thing.
Book is a paper material. etc.

In FIG. 2, an example of the generic relationship is the relation 203 defined between the concept 211 (BOOK) and the concept 212 (PERSON). This means that there can be a relation "author" or "work" between "book" and "person". This generic relationship can be read in both the directions, i.e. towards either right or left, as follows;

(BOOK (is-written-by PERSON))
(PERSON (has-written BOOK))

The instance relation is a relation as indicated by a link 204 indicated by a broken line in FIG. 2, which represents a concrete example (called also instance value for the data base) of a certain generic relationship. For example, in FIG. 2, an instance relation 204 is defined between a concept 213 and a concept 214 as a concrete example of the generic relationship 203, which is "author". With the frame expression it can be written as follows;

```
(BOOK#0051 (is-a BOOK)
           (is-written-by NEWTON))
  (NEWTON  (is-a PERSON)
           (has-written BOOK#0051))
```

With the natural language they can be written;

```
BOOK#0051 is a book
     which is written by NEWTON.
NEWTON is a person
     who has written BOOK#0051.
```

The knowledge described above is memorized, according to this invention, in a data structure, as stated below. At first the concept and the name thereof are memorized in a concept name table 221 (FIG. 3). The same table 221 consists of three columns 222, 223 and 224. The column 222 indicates the unique number C# of the concept and the name CNAME thereof is defined in the column 223. The language LANG of the name is prescribed in the column 224. For example, when the value of LANG is "J", the name is written in Japanese and when it is "E", the name is written in English.

Further, a plurality of concept names can be defined for one language. For this reason, for the data structure in the column 223 it is allowed to repeat the data. For example the name of the concept C# 0004 is "book" (in Japanese) and "BOOK" and "printed matter" (in Japanese) can be added also thereto.

Figure 4:
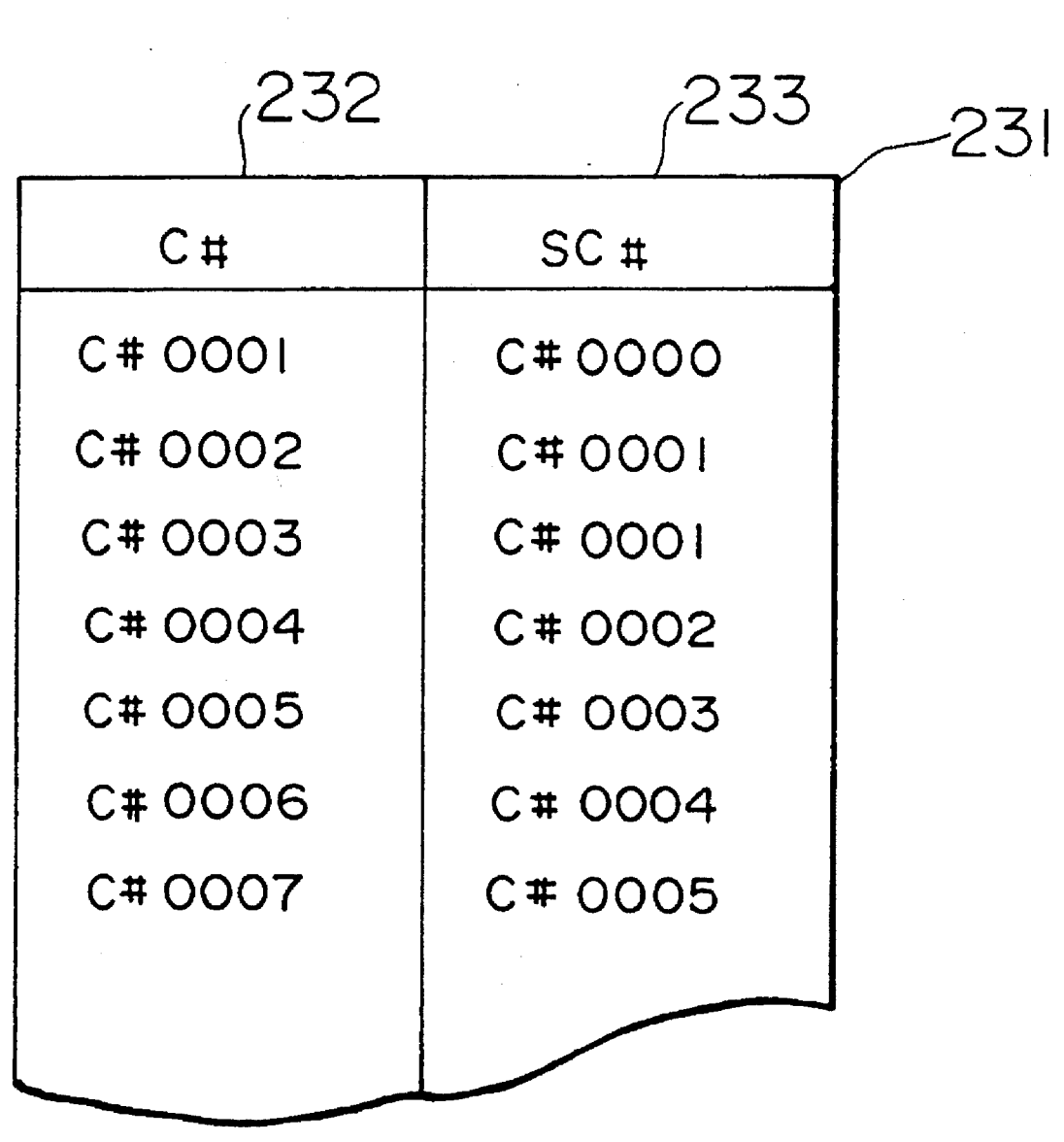

Now, the subsumption relation of the concept is represented in a subsumption relation table 231 indicated in FIG. 4. Columns 232 and 233 indicate unique numbers C# and SC# for respective concepts and represent that the superconcept of the concept C# is the concept SC#. For example, the second record in the table 231 indicates that the superconcept of the concept C# 0002 ("paper material") is the concept C# 0001 ("thing"). The "relation" such as a property, which is defined for each concept, is inherited from a higher rank to a lower rank through a link of the subsumption relation. In this case, it is possible to define a plurality of superconcepts for one concept. Consequently multiple property inheritance is realized.

Various kinds of relations between different concepts other than the subsumption relation can be defined in a generic relationship defining table 241 indicated in FIG. 5. Each of the generic relationships represents the kind of the relation. Basically there is no limit for the number of such kinds of relations and it is possible to define an arbitrary number of generic relationships.

The generic relationship defining table 241 defines principally "reading", when the "relation" is expressed by a natural language. A column 244 indicates "reading" LR, when the relevant relation is read from left to right, and a column 245 defines "reading" RL read from right to left contrarily thereto. In the data structure of these columns it is allowed to repeat data so that it is possible to define a plurality of readings. Further, just as for the concept name table, it is possible to specify the language for the reading. Consequently it is possible to express same data in a plurality of languages.

In the example indicated in FIG. 5 the relation "AUTHORSHIP" can be expressed by a natural language (English in this case) as follows;

```
  PERSON who is author of BOOK
  PERSON who is the author of BOOK
  PERSON who wrote BOOK
  PERSON who has written BOOK
or
  BOOK whose author is PERSON
  BOOK by PERSON
  BOOK from PERSON
  BOOK of PERSON
```

This is the same also for the Japanese expression (not described).

The existance of relations between different concepts is memorized according to a relation table 251 indicated in FIG. 6. As explained above, in the relation links, there are generic relationships and instance relations. These are distinguished by a column 256 in the table 251. When the value in a column CLASS is GR, it is a generic relationship and when the value is INST, it is an instance relation. In the example indicated in FIG. 6, the first record represents the generic relationship 203 in FIG. 2 and the second record indicates the instance relation 204 in FIG. 2. Further a column C#L defines the concept on the left side and a column C#R the concept on the right side. In this case, on which side a certain concept is located, right or left, depends on the definition and as far as there is no contradiction for the tables 241 and 251, it may be defined on either side.

Now the principle of the natural language understanding method based on the knowledge expressing method described above will be explained.

At first the method for understanding nominal compounds, which is the most important in the object-oriented knowledge base will be explained. Here a nominal compound means a noun phrase consisting of a series of nouns including partially adjectives. For example, the following are examples of the nominal compounds;

| | |
|---|---|
| supercomputer article | (1) |
| ElectronicsWeek article | (2) |
| Japanese personal computer company | (3) |
| Americal personal computer software packages | (4) |

In this case understanding the significance means to obtain positively the relation among these adjectives and nouns.

For example, although the nominal compounds (1) and (2) have a same structure, they have different significances. They should be interpreted as follows; (1) means; "article whose subject is supercomputer" and (2) means; "article which is part of ElectronicsWeek". That is, it is necessary to deduce that in (1) "article" and "supercomputer" are combined through a relation "subject-is" and that in (2) "article" and ElectronicsWeek" are combined through a relation "is-part-of". Understanding the significance is to extract automatically following structures, when they are described in the frame form;

| | |
|---|---|
| (ARTICLE (subject-is SUPERCOMPUTER)) | (5) |
| (ARTICLE (is-part-of ElectronicsWeek)) | (6) |

By the method for natural language understanding according to this invention, the significance is interpreted, as follows, on the basis of the knowledge indicated in FIG. 7. At first, as knowledge making this deduction possible, relations RS# 0011 as generic relationships;

| | |
|---|---|
| (ARTICLE (subject-is UNIVERSAL)) | (7a) |
| (UNIVERSAL (is-subject-of ARTICLE)) | (7b) |

and relations RS# 0012

| | |
|---|---|
| (ARTICLE (is-part-of JOURNAL)) | (8a) |
| (JOURNAL (has-part-of ARTICLE)) | (8b) |

should be defined. That is, it is necessary that "anything can be a subject of an article" and "the article is a part of a journal (the article is published in a part of a journal)" are memorized as knowledge.

Further, as a subsumption,

| | |
|---|---|
| (SUPERCOMPUTER (is-a THING)) | (9) |
| (THING (is-a UNIVERSAL)) | (10) |
| (ElectronicsWeek (is-a JOURNAL)) | (11) |

should be memorized.

By using these memories it is possible to interpret "supercomputer article". At first, following the subsumption relation towards the higher rank from SUPERCOMPUTER, it is possible to understand;

(SUPERCOMPUTER (is-a UNIVERSAL))
(UNIVERSAL (is-subject-of ARTICLE)).

As the result, by the property inheritance, it is deduced that there can be relations;

(SUPERCOMPUTER (is-subject-of ARTICLE))
or
(ARTICLE (whose subject-is SUPERCOMPUTER)).

That is, it is deduced that "a supercomputer can be a subject of an article". In this case, since there is no other interpretation, the interpretation;

"article whose subject is supercomputer" is adopted.

The interpretation of the significance of the nominal compound (2) is a little more complicated.

Figure 7:
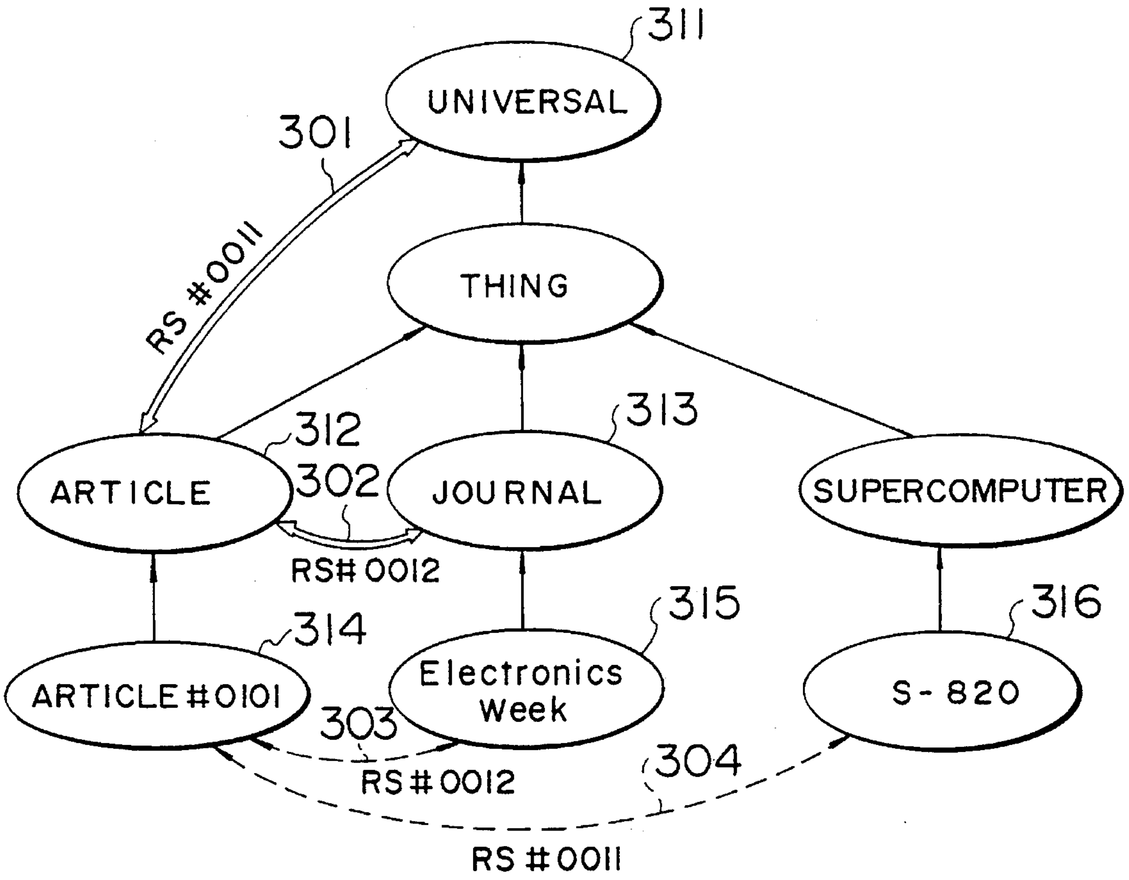
FIG. 7 is a scheme for explaining the principle of the method for interpreting the meaning of nominal compounds.

In this case, since (ElectronicsWeek (is-a JOURNAL))
(JOURNAL (has-part-of ARTICLE))

and at the same time (ElectronicsWeek (is-a UNIVERSAL))
(UNIVERSAL (is-subject-of ARTICLE))

as it can be clearly seen from FIG. 7, it is deduced that there can be two relations;

(ElectronicsWeek (has-part-of ARTICLE))
and
(ElectronicsWeek (is-subject-of ARTICLE)).

That is, it is understood that there can be two interpretations;

"article which is part of ElectronicsWeek" and

"article whose subject is ElectronicsWeek"

In the case where there exist a plurality of candidates of interpretation, the method according to this invention utilizes a heuristic method, by which the likelihood of the interpretations is evaluated, depending on which interpretation has more concrete examples.

Concretely speaking, in the preceding example, the numbers of instance relations for the relation RS# 0011 and the relation RS# 0012, which are registered, are counted, respectively, while querying the subconcepts of the concept "ARTICLE" and the concept "ElectronicsWeek", including themselves. In the example indicated in FIG. 7, O for the former and one concrete relation for the latter are registered. That is, there is no article, whose subject is "ElectronicsWeek", but there is one article, ARTICLE # 0101, which is published in "ElectronicsWeek". Consequently the relation RS# 0012 (is-part-of) is selected as the more suitable interpretation. That is, it is interpreted as follows;

"article which is part of ElectronicsWeek".

As explained above, the interpretation of nominal compounds is based on a deduction processing of the relation between 2 nouns. That is, the basic processing of the interpretation of a nominal compound consisting of more than 3 words, as explained below, consists of extracting the relation between 2 words described above. This will be explained below, taking the nominal compound (3) as an example.

At first, the concept corresponding to each of the words is selected, while examining whether there are concept names consisting of a composite word among the words constituting the nominal compound or not. That is, the words are cut-off one after another from the beginning and it is examined whether they are registered or not, referring to the concept name table.

In the case of the nominal compound (3), partial series of words such as;

| | | | |
|---|---|---|---|
| "Japanese" | | | |
| "Japanese | personal" | | |
| "Japanese | personal | computer" | |
| "Japanese | personal | computer | company" |
| | "personal" | | |
| | "personal | computer" | |
| | "personal | computer | company" |
| | | "computer | company" |
| | | | "company" |

are cut-off and it is examined whether each of them is a concept name or not.

At this time, the method according to this invention is characterized in that an adjective is registered as a synonym of the concept, whose name is the noun form corresponding thereto, and the adjective is dealt with as a same concept as the noun. For example, the adjective "Japanese" is registered as a synonym of the concept "JAPAN" or the concept "Japanese people" and dealt with as the same concept.

Consequently, as the result, supposing that "personal computer" is defined as a concept name "PERSONAL-COMPUTER", the nominal compound (3) is at first recognized as;

(JAPAN PERSONAL-COMPUTER COMPANY)
(JAPANESE-PEOPLE PERSONAL-COMPUTER COMPANY).

However, in the following explanation, in order to facilitate understanding, explanation will be made, omitting the latter, for which it is understood finally to be a meaningless interpretation.

That is, at this step, it is understood that the nominal compound is a combination of substantially three concepts. This can be expressed by using parentheses as follows;

```
(Japanese (personal computer) company)          (12)
```

Therefore the following processing is to examine how these three concepts are related with each other. In this case it can be seen that there are the following two possibilities;

```
(Japanese ((personal computer) company))        (13)
((Japanese (personal computer)) company)        (14)
```

At first, in the case of (13), it is necessary to deduct two relations, which can be connected between COMPANY and PERSONAL-COMPUTER and between COMPANY and JAPAN. In this case, by the method described previously for deducing the relation, following relations;

```
(COMPANY                                        (15a)
  (produces PERSONAL-COMPUTER)
  (is-located-in JAPAN))
(COMPANY                                        (15b)
  (has-developed PERSONAL-COMPUTER)
  (is-located-in JAPAN))
```

are extracted. Here, in order to evaluate the priority (likelihood) of a plurality of interpretations, the total numbers of concrete examples of the two relations between COMPANY and PERSONAL-COMPUTER and between COMPANY and JAPAN (concrete relations defined in the subconcepts) are counted for (15a) and (15b), respectively, so as to obtain weights for these relations. In order to obtain the evaluation for all the relations, it is normalized by dividing each of the numbers of the instance relations (weight of the relation) by the number of the generic relationships. For the examples of (15a) and (15b) the number of the generic relationships is 2.

Then, the relation is extracted for the second possibility (14). In this case two relations between COMPANY and PERSONAL-COMPUTER and between PERSONAL-COMPUTER and JAPAN should be obtained. For the former, two relations;

```
    (COMPANY (produces PERSONAL-COMPUTER))              (16a)
and
    (COMPANY (has-developed PERSONAL-COMPUTER))         (16b)
```

can be found (on the presumed knowledge base). In the same way, for the latter two relations

```
  (PERSONAL-COMPUTER                            (17a)
    (is-produced-by
      (COMPANY (is-located-in JAPAN)))
and
  (PERSONAL-COMPUTER                            (17b)
    (was-developed-by
      (COMPANY (is-located-in JAPAN)))
```

are found. At this time, since there is no relation connecting directly PERSONAL-COMPUTER and JAPAN, the concept COMPANY relating indirectly these two is found automatically.

By the method according to this invention, when no relation relating directly two concepts is found, as stated above, (sets of) all the generic relationships defined in the superconcepts of the two concepts, between which a relation is to be found, are extracted, tracing up thereto separately. Since this procedure is executed for two concepts, two sets of generic relationships are obtained. This can be extracted by querying three tables 231, 241 and 251. Next the concepts in a set of the extracted generic relationships, which are related to the other set, are listed separately for the two sets. In this way two sets of concepts are obtained and a concept, which intercedes the two concepts with each other, i.e. in the preceding example, the concept COMPANY is finally obtained by obtaining a set intersection thereof.

At last, excluding the meaningless combinations, the following two interpretations are obtained;

```
    (COMPANY                                        (18a)
      (produces
        (PERSONAL-COMPUTER
          (was-developed-by
            (COMPANY
              (is-located-in JAPAN))))))
and (COMPANY                                        (18b)
      (has-developed
        (PERSONAL-COMPUTER
          (is-produced-by
            (COMPANY
              (is-located-in JAPAN))))))
```

Finally following four interpretations in total

```
    "company                                        (19a)
        which produces personal computer
        which is located in Japan"
    "company                                        (19b)
        which has developed personal computer
        which is located in Japan"
    "company                                        (19c)
        which produces personal computer
          which was developed by company
            which is located in Japan"
and "company                                        (19d)
        which has developed personal computer
          which is produced by company
            which is located in Japan"
```

are obtained automatically. In the expressions stated above in English, the antecedence relation of the relative pronouns is indicated by the indentation. In the case where the head of a line stands back from the head of the directly preceding line, a noun in the directly preceding line is the antecedent of the relative pronoun in the succeeding line.

The nominal compound (4) can be dealt with in the same way. At first, by matching each of the words with the concept noun thereof, it can be understood that it consists of three concepts such as;

(USA PERSONAL-COMPUTER SOFTWARE-PACKAGE)

By deducting the relations among these concepts, a following interpretation can be obtained;

```
"software package                               (20)
    which runs on personal computer
    which was developed by company
      which is located in USA"
```

The method for natural language understanding according to this invention makes a stronger noun phrase interpreting function possible by putting a sentence interpretation unit (syntactic analysis unit) on the semantic interpretation function for nominal compounds and at the same time realizes a wide spread dialogue using natural languages with the knowledge base. The sentence interpretation section utilizes syntax rules. List 1 shows an example of the syntax rules. A syntax rule consists of three parts, i.e. a left member constructed by a non-terminal symbol (here symbol enclosed by hook-shaped parentheses <>), a right member, which is a developed form thereof and a function, which is to be evaluated, when the development is successful (e.g. Formula (21a)) . However, in List 1, the evaluation function, when the analysis is successful, is omitted. The right member of each of the rules is composed of a series of a terminal symbol and non-terminal symbols. Here a symbol "|" represents a juxtaposition. Further the non-terminal symbol <s> represents a whole sentence

```
List 1:
<s> ::=       <system-command> |                              (21a)
              <define-command> |                              (21b)
              <search-command> |                              (21c)
              <browse-command>                                (21d)
<system-command> ::= load from <?> |
              save to <?> | update | quit | stop |
              <show-word> chart | edit <?>
<show-word> ::= show | print
<search-command> ::=
              <find-word> <noun-phrase> .                     (22)
<find-word> ::= look up | look for |
              search for | lookup | find                      (23)
<noun-phrase> ::= <noun-group> |                              (24a)
              <noun-phrase> <joiner> <noun-phrase>            (24b)
<noun-group> ::= <noun-compound> |                            (25a)
              <art> <noun-compound> |                         (25b)
              <def-art> <noun-compound>                       (25c)
<noun-compound> ::= <noun-string>                             (26)
<noun-string> ::= <concept> |                                 (27a)
              <concept> <noun-string>                         (27b)
<joiner> ::= <prep> |
              <rel-pronoun> <link>                            (28)
<define-command> ::=
              define relation <new-phrase> . |                (29a)
              define <?> as <noun-phrase> . |                 (29b)
              <noun-phrase> is <noun-phrase> . |              (29c)
              <noun-phrase> <link> <noun-phrase> . |          (29d)
              <noun-group> is also known as <?> .             (29e)
<new-phrase> ::=
              <noun-compound> <?> <noun-compound>             (30)
<?> ::= <null> | <null> <?>                                   (31)
```

The syntactic analysis unit consists of a lexical analysis unit which is a bottom-up processing and a syntactic analysis unit which is a top-down processing. The syntactic analysis unit according to this method outputs all the sentence structures, which are in accordance with the syntax rules as candidates. Therefrom only the meaningful interpretations (modifying relation between words) are evaluated and selected by the nominal compound analysis explained previously.

The lexical analysis, which is a bottom-up processing, is effected by using a lexicon, in which classification of the concept noun, the relational descriptor, the preposition, the relative pronoun and the article is described.

The lexicon can be constructed automatically by edition processing by the conceptual network by the knowledge representation explained previously. Concretely speaking, the concept name is extracted from the table 221 (FIG. 3). As the lexical analysis, a word in an inputted sentence, which matches with the concept name, is recognized as a non-terminal symbol, which is <concept>.

The relational descriptor means the "relation" or the "reading" thereof in the knowledge representation and includes e.g. "is author of", "wrote", "has written", "author is", etc. These are extracted from the generic relationship defining table 241 (FIG. 5). A word or a series of words in an inputted sentence, which match therewith, is recognized as a non-terminal symbol <link>.

The preposition includes "by", "from", "of", etc. and their meaning (kind of the relation, which each of them represents) is extracted automatically from the generic relationship defining table 241 (FIG. 5). These prepositions are recognized as a non-terminal symbol <prep>. At this time, in the case where a relational descriptor and a preposition are recognized, the kind of the "relation", which they mean, and their direction are outputted as results of the lexical analysis together with the non-terminal symbol described above. In this way, as stated later, it is possible to interpret the significance of a noun phrase such as "book by Newton" (refer to syntax rules (24b) and (28)).

In the lexicon are memorized further relative pronouns <rel-pronoun> (which, who, that), indefinite articles <art> (a, an) and the definite article <def-art> (the). The words, which couldn't be recognized by the lexical analysis, are recognized as a non-terminal symbol <null>.

The syntactic analysis is effected on the basis of the lexical analysis as a bottom-up preprocessing. The syntactic analysis method will be explained, referring to FIG. 8. In the figure three words 401, 402, 403 as an inputted sentence are analyzed. Arrows directed from the upper portion to the lower portion (e.g. an arrow 411) represent bottom-up processings and arrows directed from the lower portion to the upper portion (e.g. an arrow 412) represent top-down processings.

As results of the lexical analysis, it is outputted that the word 401 (personal) has no matching concept, that for the interpretation of the word 402 (computer) there can be two concepts "computer" and "computer magazine", that a series of words 401–402 (personal computer) matches with a concept "personal computer" and that the word 403 (company) matches with a concept "company".

Figure 8:
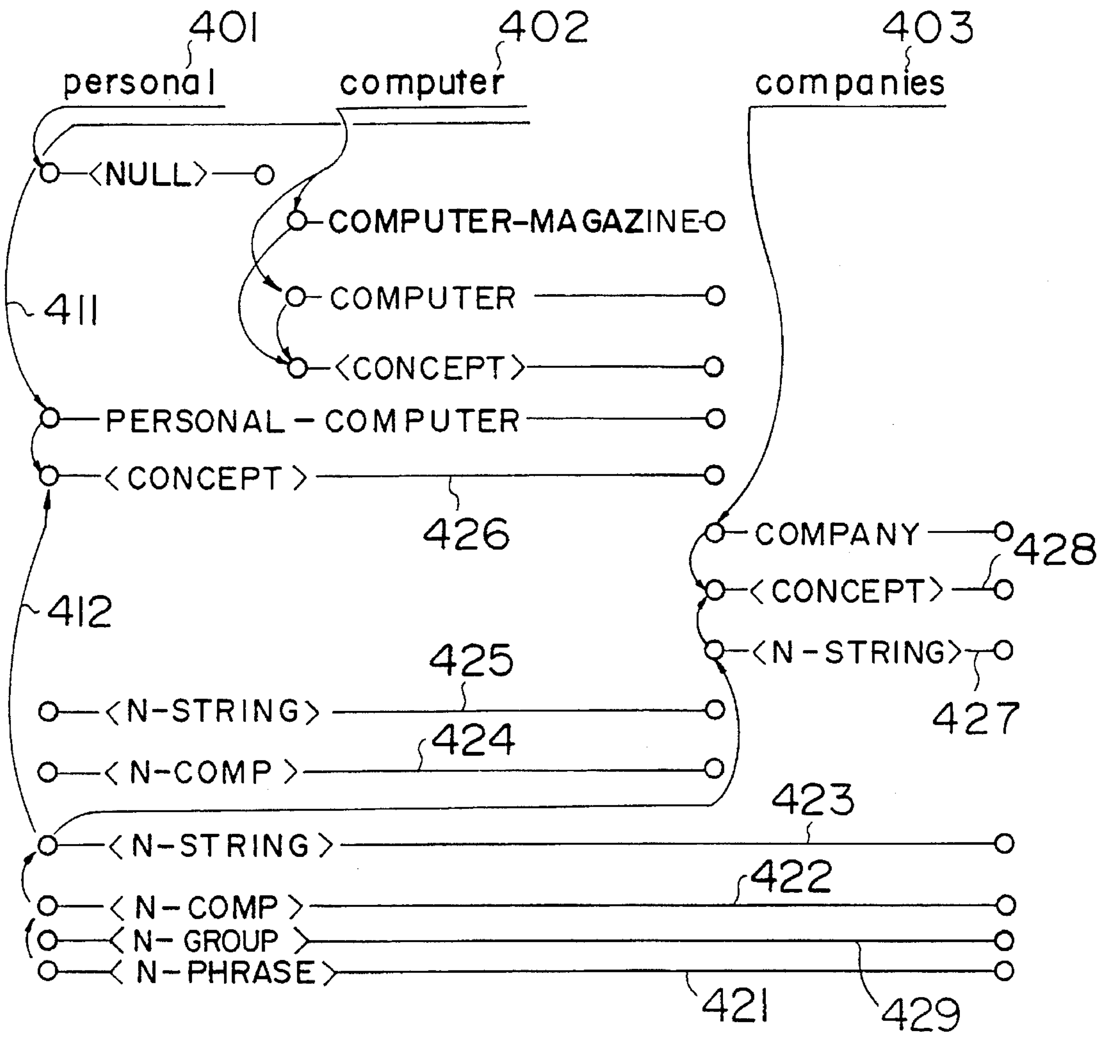
FIG. 8 is a scheme for explaining a method for analyzing the structure of sentences.

The syntactic analysis unit receives these results and develops the whole sentence, referring to the syntax rules indicated in List 1. FIG. 8 shows the procedure only after a point in the course. In the figure <noun-phrase> 421 is developed to <noun-group> to <noun-compound> 422 by using Formulas (24a) and (25a) and further to <noun-string> 423 by using Formula (26). Furthermore <noun-string> is developed to <concept> 426 and <noun-string> 427 by using Formula (27b). The latter <noun-string> is developed to <concept> 428 by using Formula (27a). Finally, in the example indicated in FIG. 8, it can be understood that the inputted sentence (noun phrase) can be interpreted to be a noun compound consisting of two concepts (personal computer) and (company).

In FIGS. 8 to 11, in order to simplify the figures, the symbols indicated in List 1 are simplified as follows: That is, <noun-phrase>, <noun-group>, <noun-compound>, <noun-string>, <joiner>, <rel-pronoun> and <find-word> are expressed by <n-phrase>, <n-group>, <n-comp>, <n-string>, <join>, <rpron> and <find>, respectively.

In this syntactic analysis all the sentence structure syntactically possible are extracted. As an algorithm for such a syntactic analysis there is known e.g. Thompson, H., et al., "Implementing Natural Language Parsers," in Artificial Intelligence: Tools, Techniques, and Applications, edited by T. O'Shea and M. Eisenstat, Harper and Row, New York, N.Y., 1984, pp. 245–300.

All the extracted syntactic candidates are evaluated by using evaluating formulas described in the respective syntax rules. The feature of this invention consists in that knowledge stored in the knowledge base is used for this evaluation. In the case of the example indicated in FIG. 8, it is evaluated whether a meaningful noun compound can be constructed by the concept "personal computer" and the concept "company" or not. This evaluation method utilizes a method, by which knowledge registered in the concept network explained previously is used. As this result, results of the analysis of meaningful sentence structures are obtained in the order of likelihood.

Figure 9:
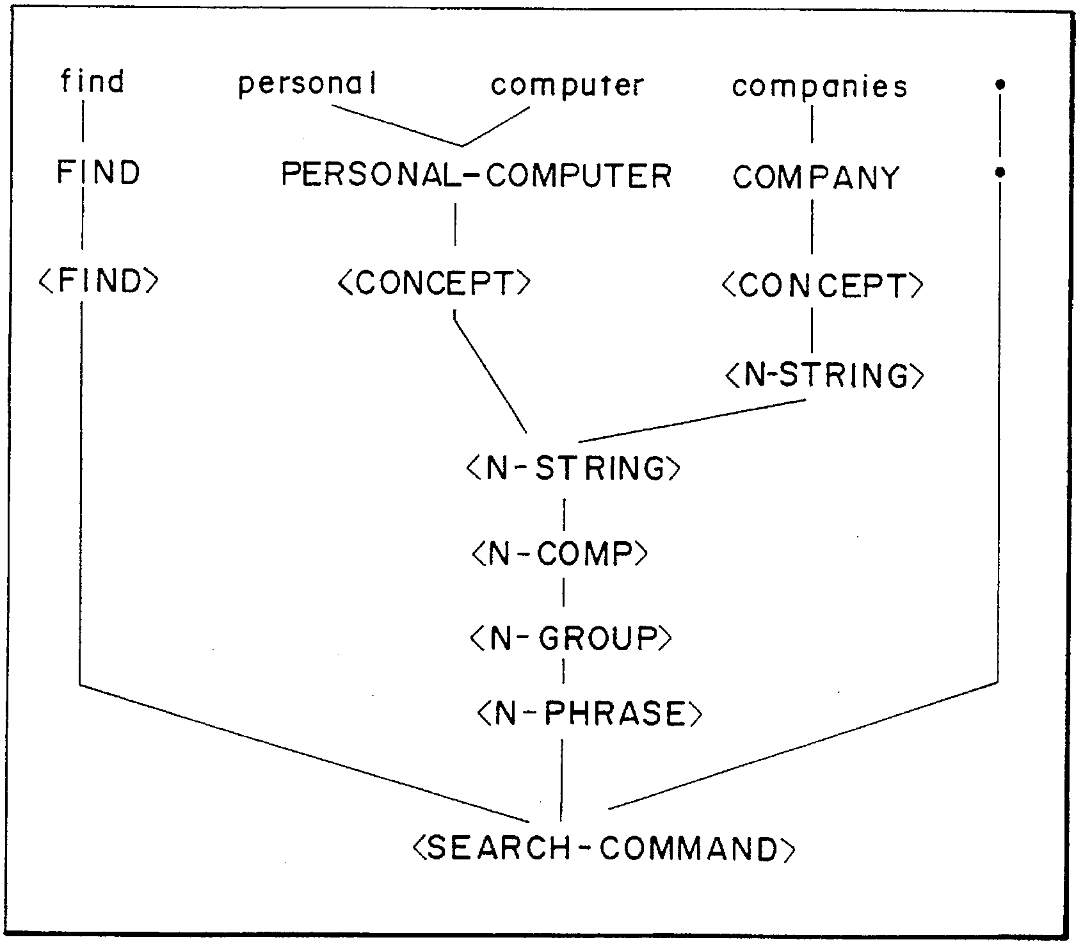
FIGS. 9, 10 and 11 show examples of the analysis of the structure of sentences.
Figure 10:
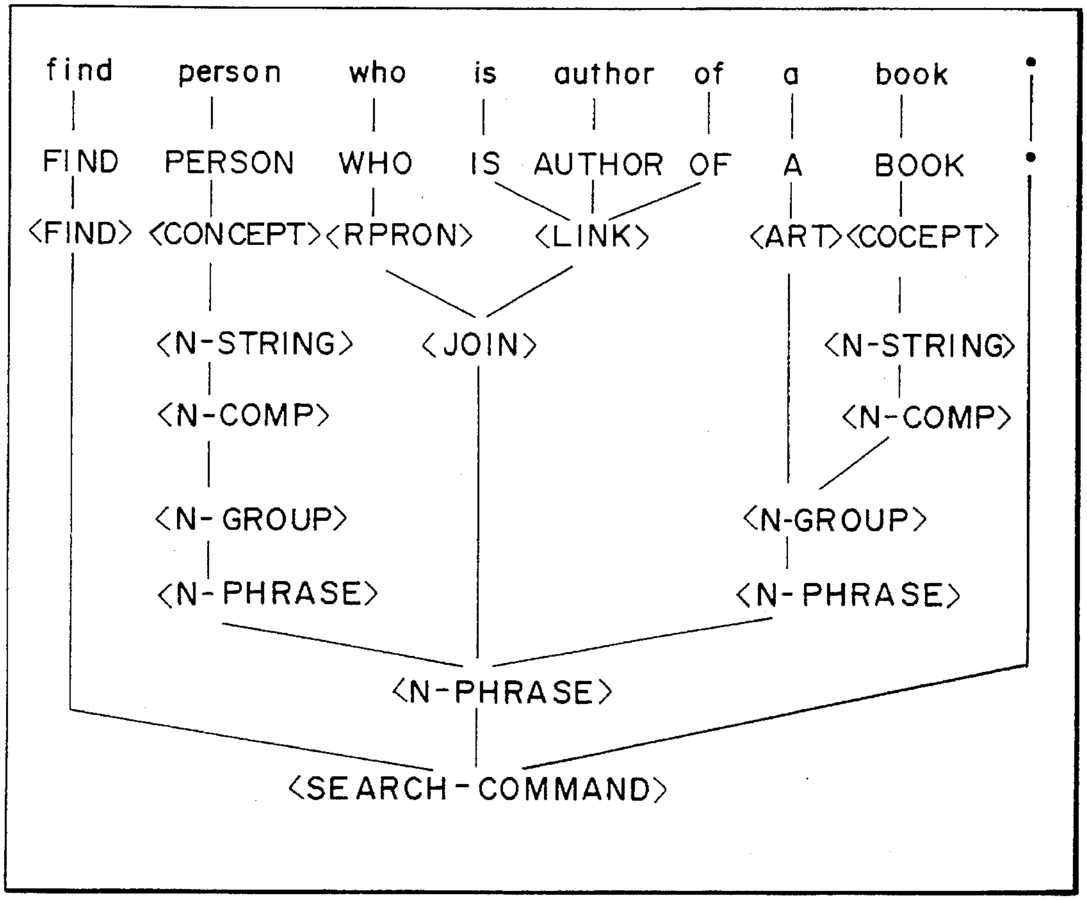
Figure 11:
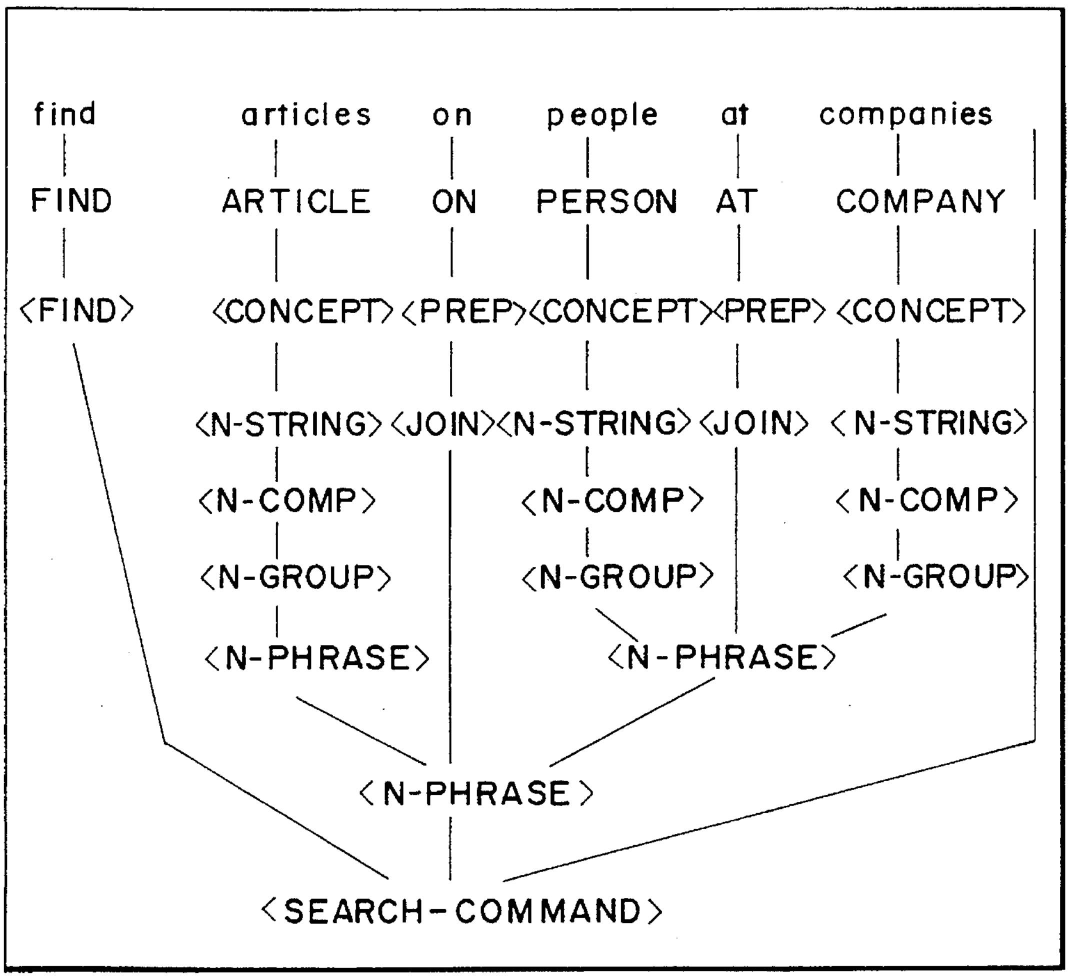

FIG. 9 and the following indicate the results of the syntactic analysis for the whole query expression. The query expression is developed to an imperative term and a noun phrase by using the syntax rules (21c) and (22). FIG. 9 shows an example including the noun phrase indicated in FIG. 8. FIG. 10 shows an example of the analysis of a query expression including a relative pronoun and a noun phrase. At this 'time it is understood that the "reading" of the "relation" of the concept relation model indicated in FIG. 5 functions as a predicate in a relative pronoun phrase. Further, FIG. 11 shows an example of a query expression including a preposition. Here, as it has been already explained, it is described in the generic relationship defining table indicated in FIG. 5 that the preposition "on" means a relation "subject" ("whose subject is") and that the preposition "at" means a relation "position" ("who works at").

According to the principle explained above it is possible to interpret the significance of a sentence written in a natural language and including a series of nouns (nominal compound), whose relation is not described explicitly, by the knowledge base and the minimum syntax rules.

Figure 14:
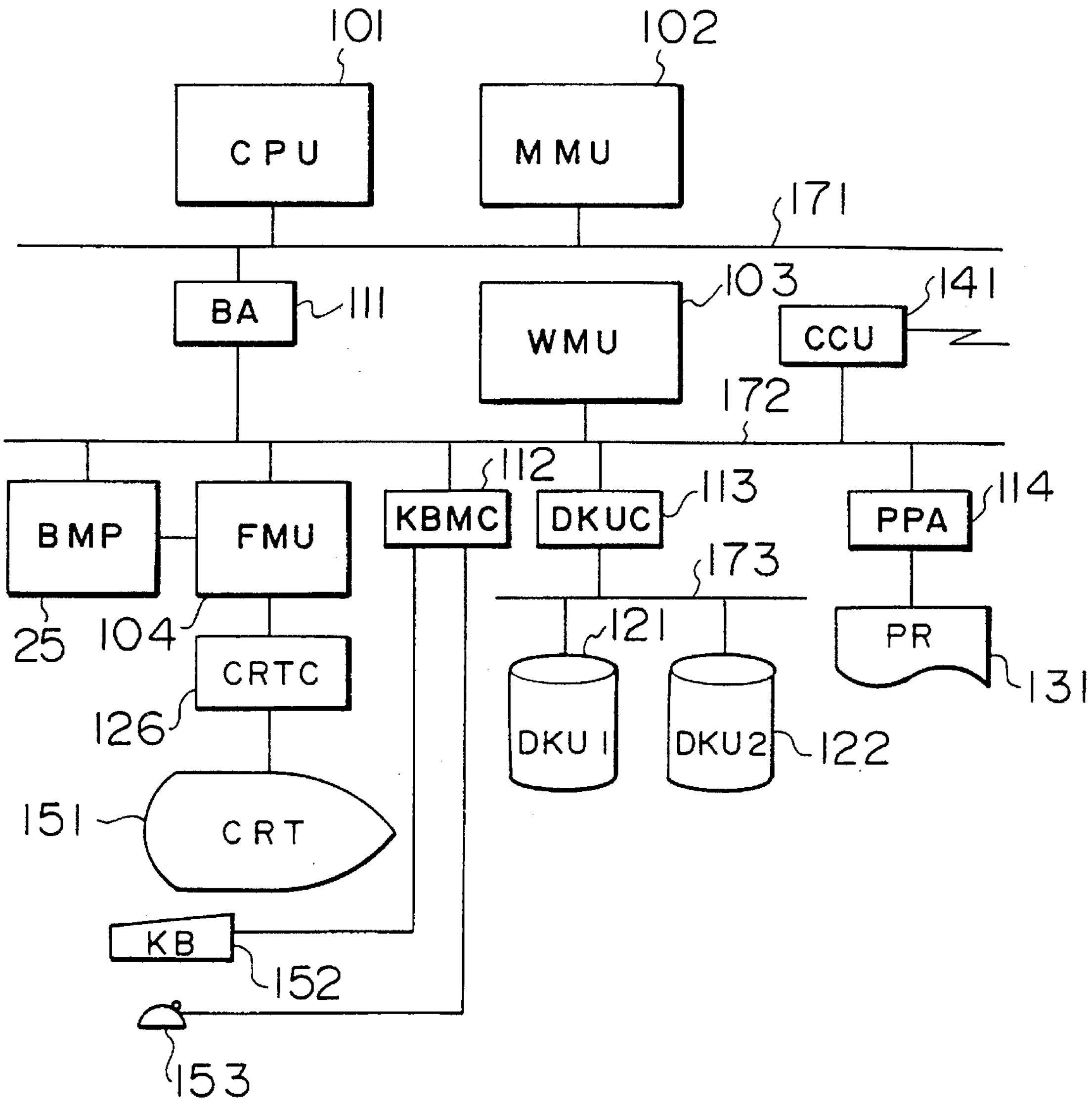
FIG. 14 is a block diagram illustrating the construction of the hardware for a system, which is an embodiment of this invention.

Hereinbelow an embodiment of this invention will be explained. FIG. 14 is a block diagram illustrating the construction of the hardware of the knowledge base system, which is an embodiment of this invention.

In the figure, the system consists principally of a central processing unit (CPU) 101, a main memory unit (MMU) 102, a work memory unit (WMU) 103, a unified disk unit 121, 122 having a system file and a user file, a printer 131, a communication control unit (CCU) 141 for connecting the system with a local area network (LAN) (not shown), a display unit (CRT) 151 for dialogue with users, a keyboard 152 and a mouse 153.

The unified disk unit 121, 122 consists of a magnetic disk and an optical disk. For example, in the case of this embodiment, a first disk unit (DKU 1) 121 is constructed by a magnetic disk, which memorize information, for which a high speed is required. On the other hand a second disk unit (DKU 2) 122 is constructed by an optical disk, which memorize a specifically large amount of information.

In the system file are stored a group of programs such as an operating system, a communication control program, a file management program, a knowledge base management program and an integrated office procedure supporting system, which the system provides, and a group of files such as a data base, etc., necessary therefor. On the other hand, in the user file are stored a group of application programs such as programs offering personalized systems, programs formed by users, etc., a group of files such as data bases necessary therefor and a unified knowledge base (described below) formed by users.

The operation of the system is carried out by accessing necessary data to the main memory unit and the files according to control by a program loaded in the main memory unit. At the same time it is possible to converse with the system by means of input means 152 and 153, while looking at information displayed in a display device 151.

The software portion of the knowledge base system according to this invention consists of a group of programs including a concept network editor, a conceptual network browser, a natural language interpretation program and a multimedia file management program, and a unified knowledge base unifying information, which they use. Hereinbelow each of them will be explained one after another.

At first the conceptual network editor carries out edition, search and management of the object-oriented knowledge on the basis of the concept relation model explained previously. The knowledge and information carries out the memory and the management by using the concept name table, the subsumption table, the generic relationship defining table and the relation table. Here the data stored therein are called a concept network.

The concept network editor provides following functions by using a command language (formal language) based on a predetermined specification.

(1) registration of concepts: specify the concept name and the position in a taxonomic hierarchy, and register new concepts;

(2) registration of generic relationships: specify the linguistic expression for two concepts and their relation and register the kind of a new relation;

(3) registration of instance relations: specify two concepts and the kind of the relation therebetween and register the fact, the relation, the property, etc.;

(4) edition of concept names: modify the name; delete and add synonyms and other names;

(5) edition of generic relationships: modify two concepts related with each other; modify and delete linguistic expressions;

(6) deletion of concepts:

(7) deletion of instance relations:

(8) modification of a hierarchical taxonomy:

(9) addition of superconcepts: classify doubly (or more multiply) a same concept, give multiple property inheritance, etc.;

(10) registration and deletion of structured concepts: register and delete abstract concepts (stated later) obtained by modifying a concept by another concept;

(11) updating of a lexicon: add information necessary for lexical analysis from a conceptual network to a lexicon and edit it;

(12) concept matching: search partial series of letters, keywords and structured concepts;

(13) network browsing: displace a taxonomic hierarchical tree and a current concept by association of idea.

(14) addition and deletion of multi-media information: add or delete information within a multi-media file to or from an arbitrary concept by association of idea; and

(15) read out of multi-media information: read out multimedia information added to a concept from a multi-media file.

Now the structured concept in the functions described above will be explained. A structured concept is an abstract concept modified (whose significance is restricted) from a certain concept by a relation thereof with another concept, and stored in memory means other than that for the conceptual network. Concretely speaking, the nominal compound stated in the above examples corresponds thereto. For example, a structured concept D# 0011 can be registered as (D#0011 "supercomputer article" (article (subject-is supercomputer))).

More concretely speaking, it is memorized by its proper number such as a following internal data structure;

(D#0011 "supercomputer article" (C#0401 ((RS#0033 LR) C#0501))).

Here the first member represents the proper number of the structured concept, the second member the name of the structured concept, and the third member the formula defining the structured concept. In the example of expression stated above C# 0401 indicates the proper number of the concept "article", C# 0501 that of the concept "supercomputer" and RS# 0033 that of the relation "subject".

This structured concept is used for querying information from an abstract or a descriptive memory. This system has a function of querying a concrete concept from a conceptual network by a deducing processing on the basis of the structured concept. In the example stated above, it is possible to extract only the concepts, whose subject is subsumed by the concept "supercomputer", from an assembly of concrete concepts subsumed by the concept "article" (subconcepts of the concept "article"). This processing is called concept matching and it can be realized by a deducting processing inversely directed.

In this way it is possible for a user to register arbitrarily his manner of understanding in a system and to query easily a concept which he desires by giving means for storing structured concepts and means for querying them from that means.

In the function of the conceptual network editor the multi-media information function will be further explained below. In the multi-media file it is possible to register and accumulate a photo inputted e.g. by means of an image scanner. The conceptual network editor has a function of adding the photo to a certain concept by association of idea. Concretely speaking, it realizes it by forming and supervising a correspondence table of proper numbers of the concepts and names of multi-media file members. The user can have the photo displayed after having queried the concept. In the multi-media file it is possible to record document images, acoustic information etc. apart from photos.

Since this conceptual network editor can be constructed by using the method disclosed in a patent specification entitled "A method for storing information" (JP-A-61-220027), explanation thereof is omitted here.

Now the conceptual network browser will be explained. The conceptual network browser is a visual interface for the conceptual network editor and it is tried to increase operability by adopting the direct manipulation method using a multi-window and a mouse. The browser can display the content of the knowledge base in the form of a conceptual hierarchical tree, in the frame format or in the table format, or further in the form of a natural language in an arbitrary window. Further it can call and execute an arbitrary function of the conceptual network editor described previously by specifying directly an object (concept and relation) on the display e.g. by using the mouse and further selecting and specifying an instruction within the menu. The conceptual network browser translates such a user's direct instruction into a command language, which is the formal language, to start the conceptual network editor.

Figure 1:
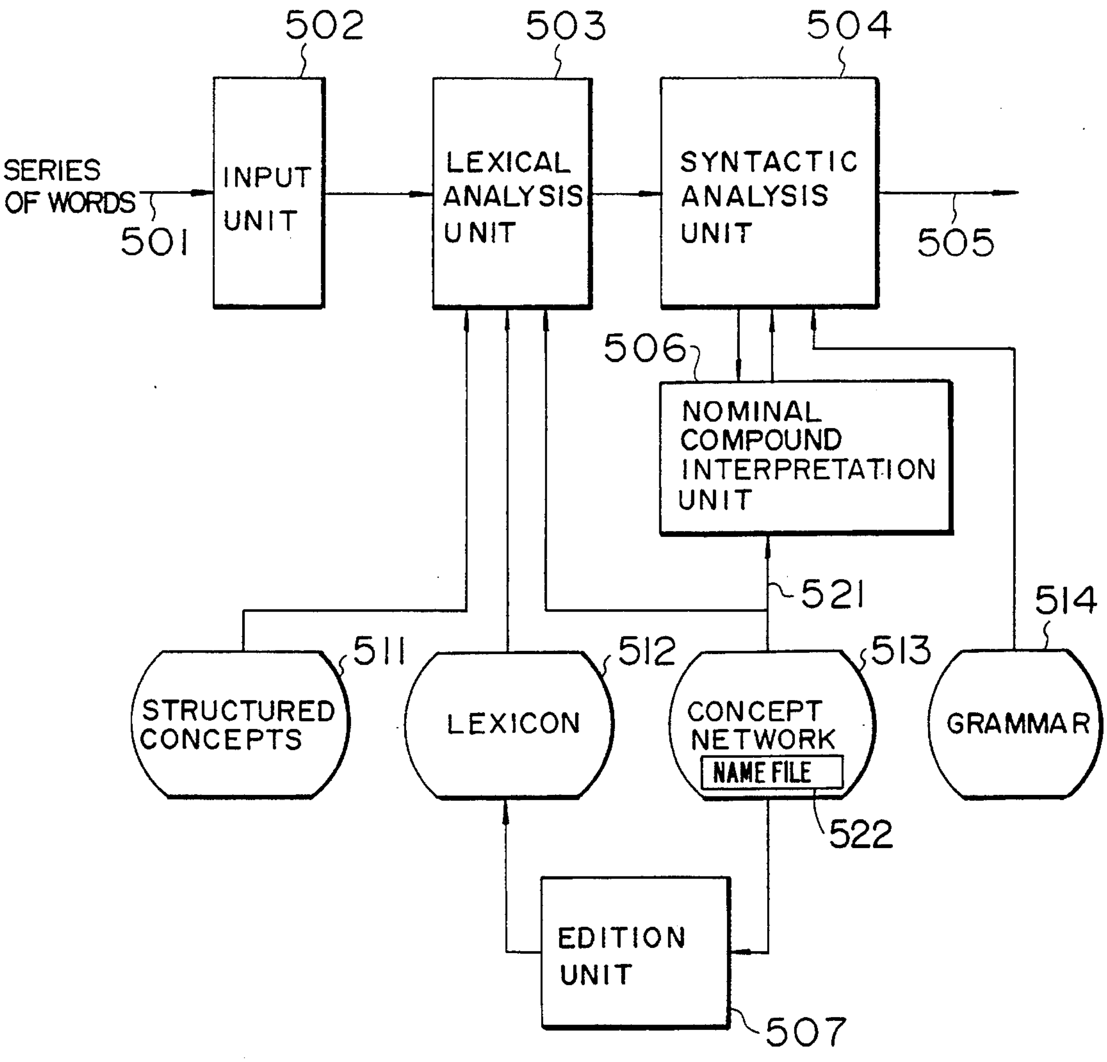
FIG. 1 is a functional block diagram representing a natural language expression interpreting program by the method according to this invention.

Next the program for interpreting a sentence written in a natural language will be explained below, referring to a functional block diagram, FIG. 1. One of the features of this invention is in its method for interpreting a sentence written in a natural language, whose principle has been explained already. The program for interpreting a sentence written in a natural language consists of an input section 501 for inputting a series of words from the user, a lexical analysis section 503 for analyzing of each of the words in the series, a syntactic analysis unit 504 for analyzing the syntax, referring to a grammar file 514 storing syntax rules, and a nominal compound interpretation unit 506. The program for interpreting a sentence written in a natural language is operated so as to receive a sentence 501 written in a natural language from the conceptual network browser and to return interpretation results 505 to the same conceptual network browser.

In this embodiment the lexical analysis unit carries out the analysis, referring to a structured concept file 511, a lexicon file 512 and a concept name file 522 in a conceptual network type knowledge base 513. In this case the structured concept file 511 memorizes 3 assemblies of proper numbers of structured concepts, names of structured concepts and structured concept defining formulas. Further the lexicon 512 consists of a preposition table 601 indicated in FIG. 12 and a relational descriptor table 611 indicated in FIG. 13. In another embodiment, for a high speed processing, the lexicon can be constructed so as to include the concept name table 221 shown in Fig.

The preposition table 601 stores, for each preposition, proper numbers of generic relationships, which the relevant preposition represents, for every direction of the relevant relation. Referring to the example indicated in FIG. 12, the preposition "at" represents the "relation", in the case where the generic relationship RS# 0123 is read from left to right, where RS# 0209 is read from right to left, etc. Further the relational descriptor table 611 stores, for each relational descriptor, the proper number and the directivity of the relevant generic relationship. These two tables can be automatically constructed and updated from the general concept defining table indicated in FIG. 5 by storing separately all the possible prepositions, as it can be easily understood from the above explanation. This function is provided by the lexicon edition unit 507 in FIG. 1 and in reality it is a part of the function of the conceptual network editor.

Now the explanation of the function of the lexical analysis unit is partially completed. Although the structured concept was not stated in the explanation of the principle of this invention in order to facilitate understanding, in the lexical analysis unit the words and a series of words matching with the structured concept name are recognized as a non-terminal symbol <concept> and at the same time, in the case where it is a structured concept, a structured concept defining formula is outputted as an evaluated value.

For this purpose, the lexical analysis unit cuts off partial series of words one after another from the inputted series of words, as described in the explanation of the principle, and examines whether each partial series of words matches not only with the usual concept name but also with the structured concept name. As the result, in the case where it matches with either one of them, the recognition result is <concept> as the non-terminal symbol. Further, in the case where it matches with the usual concept name, the proper number of the relevant concept is the evaluated value and in the case where it matches with the structured concept name, the structured concept name defining formula is the evaluated value.

Furthermore, as the result of the lexical analysis, in the case where it is recognized as a preposition or a relational descriptor, a non-terminal symbol corresponding thereto is the recognition result and at the same time all the corresponding relations are evaluated values. These evaluated values are outputted as the result of the lexical analysis together with the non-terminal symbol representing the recognition result.

The syntactic analysis unit 504 generates at first all the possible sentence structures, referring to the syntax rules in the grammar file 514 by using the results of the lexical analysis being input to the syntactic analysis unit 504, as described in the explanation of the principle. It is called parsing (in a narrow meaning) to generate sentence structures, which are possible, taking the syntax rules into account. In this parsing step the adaptability in the meaning is not taken into account. Next the syntactic analysis unit 504 has the complex noun phrase interpretation unit 506 effect the analysis of the adaptability in the meaning and the semantic interpretation of the nominal compound. In this way those, which are adapted in the meaning, are selected from the assembly of sentence structures generated as candidates in the order of the likelihood.

Since it is <noun-phrase> that is a factor particularly important in the meaning as the result of the syntactic analysis, mainly the syntactic analysis of the noun phrase will be explained more concretely, using the examples indicated in FIGS. 9 to 11.

At first, in the case of FIG. 9, a noun phrase:

"personal computer companies"

is interpreted, as the result of the parsing, as a structure indicated below:

```
(<noun-phrase>                                         (32)
    D#1009
    "personal computer companies"
    ((<concept> (C#1011 "personal computer"))
     (<concept> (C#1022 "company"))))
```

Here, in Formula (32), the first member is a non-terminal symbol; the second member is a structured concept number given on occasion; the third member is a corresponding series of words in the inputted sentence; and further the fourth member and the followings represent parsing results. In the parsing results, in the case where there exist a plurality of interpretations, they are juxaposed. In Formula (32), since there is only one candidate, the fifth member and the followings don't exist. Further the fourth member constitutes a series consisting in general of concepts and relations. The example of Formula (32) includes 2 series of concepts. Examples including relations will be explained by using Formula (35) stated later.

These concepts and relations are represented by series of concepts and series of relations, respectively, matching concretely with their descriptor (non-terminal symbol), as indicated by Formula (32). For the example indicated by Formula (32) each of the concepts has only one matching result. An example having a plurality of matching results is indicated by Formula (37).

Now the syntactic analysis unit receives the parsing result, Formula (32), and sends the last 2 lines of the formula to the complex noun phrase interpretation unit 506. The complex nominal compound interpretation unit 506 deduces the relation in the meaning between two concepts C# 1011 and C# 1022 from the knowledge base represented by the conceptual network by the method described in the explanation of the principle. As the result, (in a presumed knowledge base) following two interpretations Formulas (33) and (34) can be obtained. In this example a relation, which is not described explicitly, is extracted by the deducting processing.

```
(D#1009                                       (33)
    "personal computer companies"
    (C#1022 ((RS#0055 RL) C#1001)))
(D#1009                                       (34)
    "personal computer companies"
    (C#1022 ((RS#0056 RL) C#1001)))
```

When they are expressed in the natural language, they can be written as follows, respectively;

```
"company which produces personal computer"
"company which has developed personal computer".
```

Now another example indicated in FIG. 10 will be explained. In this case, the parsing result can be represented by Formula (35). That is, the noun phrase is recognized as two concepts unified through a joiner, as follows;

```
(<noun-phrase>                                         (35)
    D#1010
    "person who is author of a book"
    ((<concept> (C#1101 "person"))
    (<joiner> (RS#0001 RL "is-author-of"))
    (<concept> (C#1122 "book"))))
```

At this time, the complex noun phrase interpretation unit receives the last 3 lines of Formula (35), deducts that the concepts C#1101 and C#1122 can be related in the meaning with each other by a relation (RS#0001 RL), and finally obtains the interpretation represented by Formula (36). In this case, although Formula (35) indicates only one candidate, provisionally if the deduction is failed, it means that it is understood that such a semantic interpretation is not possible in view of the knowledge stored in the knowledge base.

```
(D#1010                                       (36)
"person who is author of a book"
(C#1101 ((RS#0001 RL) C#1122)))
```

Formula (36) can be expressed in the natural language as follows:

"person who is author of book"

Finally still another example indicated in FIG. 11 will be explained. In the parsing result indicated in Formula (37) the second joiner is obtained by interpreting the preposition "at", referring to a preposition table 601 indicated in FIG. 12, and a plurality of interpretations obtained as the result are cited below;

```
(<noun-phrase>                                              (37)
    D#1011
    "articles on people at companies"
    ((<concept>     (C#0401 "article"))
    (<joiner>       (RS#0033 LR "subject-is"))
    (<concept>      (C#0601 "person"))
    (<joiner>       (RS#0123 LR "is-developed-at")
                    (RS#1054 LR "is-located-in")
                    . . .
                    (RS#0209 RL "works-at") . . . )
    (<concept>      (C#1022 "company")))
```

Receiving the fourth member of Formula (37), the complex noun phrase interpretation unit 506 evaluates the appropriateness of the relation in the meaning by using the manner of thinking described in the explanation of the principle for every group consisting of 3 elements "concept-joiner-concept". That is, for the second group consisting of 3 elements, neither the relation "is-developed-at" nor the relation "is-located-in" can exist between the concepts C#0601 (person) and C#1022 (company) and it can be deducted from a concrete fact stored in the knowledge base that only the relation "works-at" can be appropriate in the meaning. In this case an interpretation represented by Formula (38) is obtained finally;

```
(D#1011                                            (38)
    "articles on people at companies"
    (C#0401
        ((RS#0033 LR)
    (C#0601 ((RS#0209 RL) C#1022))))
```

The interpretation represented by Formula (38) can be expressed in the natural language as follows;

"article
whose subject is person
who works at company"

Next the multi-media file management program, which is the succeeding element in the knowledge base system by the method according to this invention, will be explained below. The multi-media file stores information itself in the form of a media as it is, while the knowledge base stores objects or concepts by using symbols. That is, it effects most appropriate coding for each of data in order to compress the information, but it memorizes and manages a plurality of different kinds of media information (multi-media information) such as photos, documents, drawings, texts and sounds according to a predetermined descriptive method. For the method for describing multi-media information, since the multi-media contents architecture (e.g. ODA: office document architecture), which is to be adopted as the standard, is known, it is not explained here.

This multi-media information is managed for every predetermined unit constituting an object (information unit). For example, a "document", an "article", a "photo", a "graph", a segment of acoustic message, etc., which we recognize usually as one thing, can be an object. This object may be either single media or multi-media. These objects are managed by management information consisting of the file member name attached to every information unit, the memory position and the record length in a physical file, the record format (e.g. coding method), etc. by means of the multi-media file management program. It is possible also that a plurality of objects are structured so as to form another object. On the contrary it is also possible to manage a certain object as a structured body of a plurality of partial objects.

On the other hand, each of information units stored in the multi-media file can be related to an arbitrary concept node in the conceptural network, as described previously. In this way it is possible to search the information itself stored in the multi-media file by using intellectual deduction from a conceptual network type knowledge base.

Now the unified knowledge base will be explained. As explained above, the knowledge base system by the method according to this invention is characterized in that it includes a conceptual network type knowledge base, a grammar file memorizing syntax rules, a linguistic dictionary (lexicon 512) formed automatically by editing processing from the knowledge base stated above, a conceptual dictionary (structured concept file 511), which can be defined by each of users, and a multi-media file. Furthermore this system includes memory means for relating concepts in the knowledge base with objects within the multi-media file. The knowledge base, where knowledge and information by using symbols or by logic expression, linguistic knowledge and media information can be memorized organically in this way, is called a unified knowledge base. These information units are memorized in a unified disk unit according to their respective characteristics.

Although, in the above, this invention has been explained particularly for the case of English, in principle it can be extended as well to other languages such as Japanese, etc. Specifically, as described in the explanation of the knowledge representation method, according to this invention, it is possible to extend easily the system for one language to another system for plural languages. Concretely speaking, only the concept name table 221 (FIG. 3) and the general concept defining table 241 (FIG. 5) among knowledge representation means depend on the language and at the same time these table have fields (columns) LANG 224 and 246 difining the language.

Further, it is clear that this invention is not restricted to the content of the syntax rules (List 1) indicated in the embodiment, but a natural language suitable for a wider or another system can be adopted by modifying or extending the syntax rules. Also in this meaning the method according to this invention has a wide field of application. Further, although no detailed explanation has been made, also in List 1, (29a) to (29e) show that it is possible to effect registration of a new concept (29b), registration of a generic relationship (29a) or registration of a new fact (29d) by using a natural language.

Furthermore, although in the explanation of the embodiments a system unified with a multi-media file has been described, it is a matter of course that the method is efficient, even if only knowledge base system is used, independently of the multi-media file.

As explained above, according to this invention, the user can take out desired information on the basis of a descriptive query demand called to mind from ambiguous memory by using a natural language without keeping any formal language, which is difficult to study, in mind. Usually our memory becomes more and more uncertain, as the time lapses. The memory left at this time is fragmental and it becomes more and more abstract. Or it is rare that a name itself is kept decidedly in mind and it is known that it becomes more and more descriptive such as "this kind", "that kind", etc. The method according to this invention offers a method for querying desired information on the basis of a fragmental or abstract description. In this meaning this invention has an effect greater than that obtained by querying desired information simply by a natural language.

Further according to this invention, since the knowledge necessary for understanding the natural language is stored in the knowledge base in one body together with the knowledge proper to the system, it is easier to construct such a system as described above with respect to the prior art method, by which a natural language interface is to be given. Concretely speaking, it is not necessary for the user to be specifically conscious of the matching property of the natural language interface with the knowledge base, but it is sufficient to pay attention to the registration of information, for which it is desired to be originally memorized in the knowledge base and managed.

Furthermore, according to this invention, it is possible to register new knowledge by using a natural language. In general, in a system having complicated functions the coexistence of a visual interface (directly operated) and a linguistic human interface is important. According to this invention the visual interface is unified with the linguistic interface function and almost all the functions are offered by using a natural language and operating directly the system. In this meaning the user can select one of them which he desires, depending on circumstances, and therefore the method according to this invention is excellent in operatively and usability.

Furthermore this invention offers means for registering another name such as a synonym, variant spelling word, etc. for a certain concept or storing and registering another name for a relational name ("reading") and makes it possible to carry out appropriate searching processing also for an expression of multiple query demand.

In addition, this invention discloses a method for unifying multi-media information to the knowledge base, according to which it is possible to exploit a field of application wider than the knowledge base by prior art symbolic expression.

Furthermore, if a system using another language is constructed according to the method described as an extended example, it is also possible to realize to search information in English and output it in Japanese.

Next an embodiment of the query device concerning the visual interface will be explained. At first the principle and the operation, which are the base thereof, will be explained.

Figure 15:
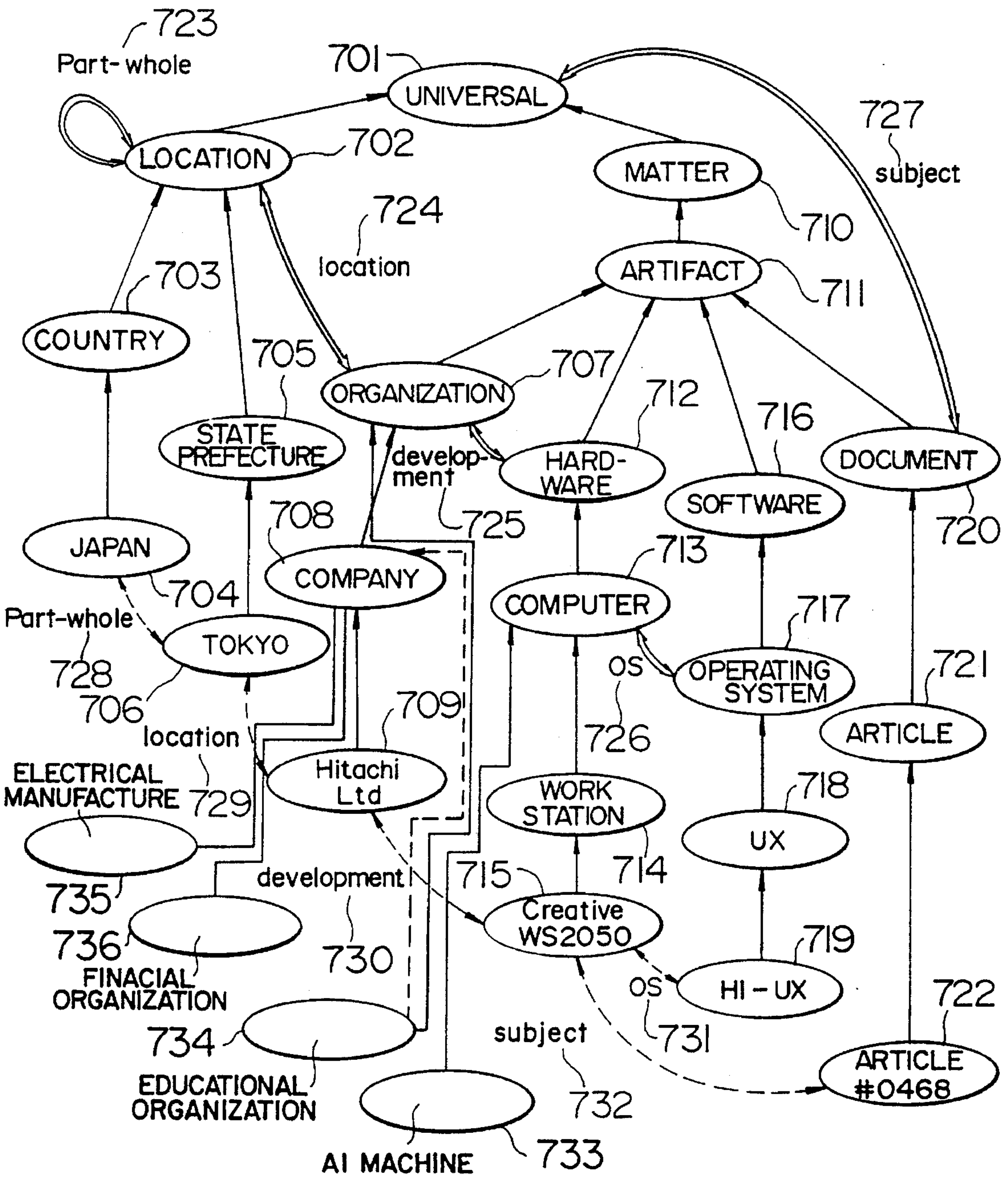
FIG. 15 is a scheme expressing concepts and relation knowledge stored in the data base.

FIG. 15 shows a detailed scheme of the concepts stored in the knowledge base, in which ellipses represent concepts and arrows indicate relations. In the knowledge base all the concepts are linked through subsumption relations, for which the concept of highest rank is a concept "UNIVERSAL". The subsumption relations represent a relation "... is one of ...". This relation has a property to belong to a higher or lower rank. Using a certain concept as a reference, the concepts belonging to the ranks higher than it are called "superconcepts (super class concepts)" and those belonging to the ranks lower than it are called "subconcepts". For example the superconcepts of "HARDWARE" 712 are "UNIVERSAL" 701, "MATTER" 710 and "ARTIFACT" 711. Further the concepts relate general knowledges with each other through generic relationships. When the relation between two concepts is expressed by a language, there are two different relation names, depending on which concept is regarded as the principal part between the two concepts. For example, "ORGANIZATION" 707 and "HARDWARE" 712 are linked through a generic relationship "DEVELOPMENT" 725. This relation has two names, i.e. "HARDWARE", which "ORGANIZATION" has developed, and "ORGANIZATION", which has developed "HARDWARE". When a relation "ORGANIZATION has developed" is added to "HARDWARE", the relation is called "addition of restriction" and when a relation "ORGANIZATION, which has developed" is added thereto, it is called "addition of a root". An instance relation is a relation, which relates concrete knowledges with each other. In order to be able to form this relation, superconcepts between the two concepts should be linked through a generic relation having the same relation name. For example, "HITACHI Ltd." 709 and "Creative WS 2050" 715 are linked through a concrete relation "DEVELOPMENT" 730. The user can browse the concepts stored in the knowledge base. Hereinbelow a concept, to which the user pays his attention at that time, is called "current concept". Further a sentence used for restricting a concept by a generic relationship is called "query expression".

Figure 16:
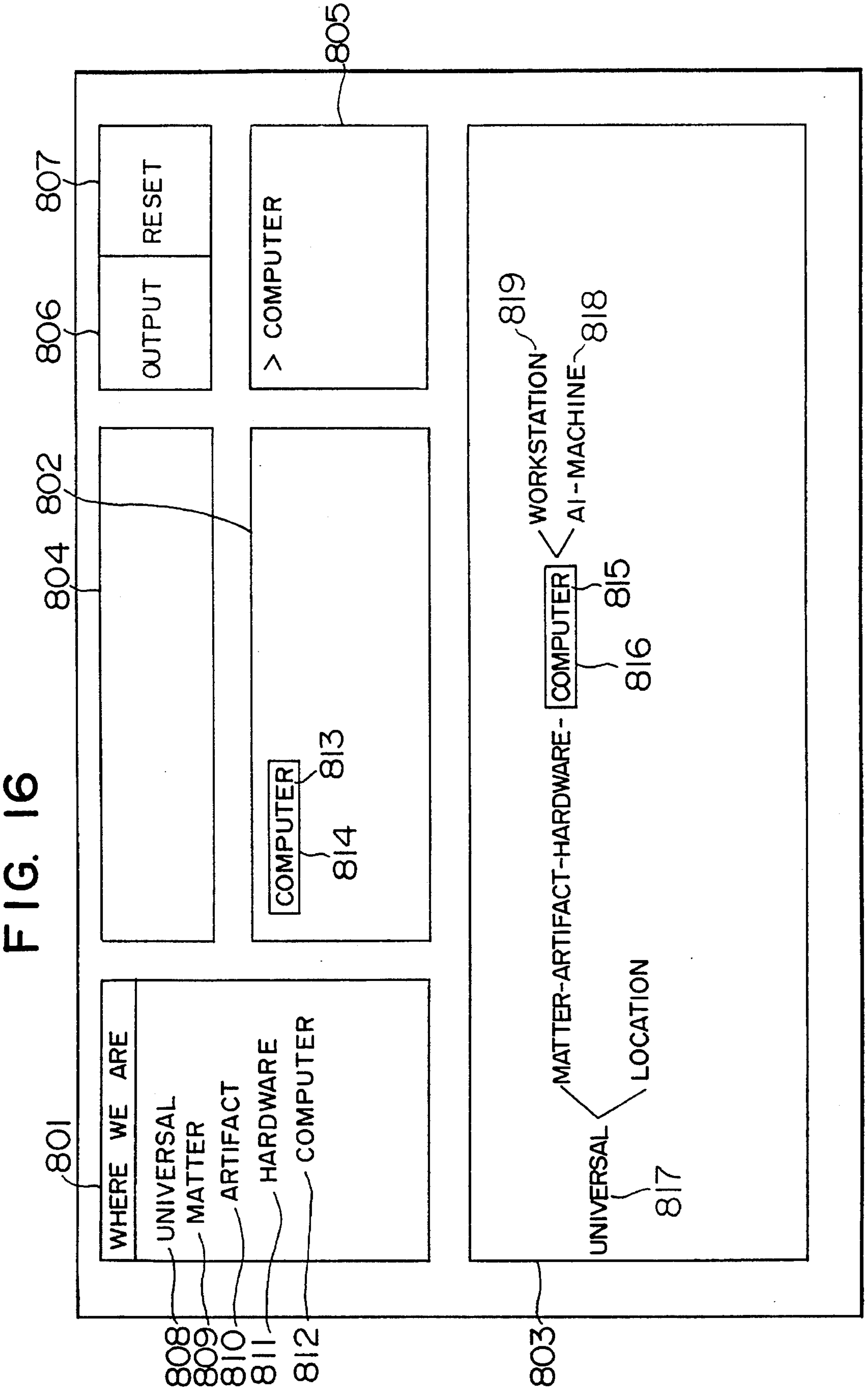
FIGS. 16 and 17 show images on a screen when concept matching is effected.

FIG. 16 illustrates an image on the screen for the dialogue with the user at a concept query. There exists a superconcept window 801 for the current concept, a query editing window 802 including the current concept, a concept tree window 803 for the concept corresponding to the query expression, a system message window 804, and an input window 805. The window 804 is an active window disposed on the screen, through which the system converses with the user. The current concept is displayed always in each of the windows and a pointer such as white and black inversion in the bitmap, frame, underline, etc. is attached thereto so that it can be easily recognized. In FIG. 16, the current concept is "COMPUTER". The system displays the concepts "UNIVERSAL" 808, "MATTER" 809, "ARTIFACT" 810, "HARDWARE" 811 and "COMPUTER" 812 connecting the concept "UNIVERSAL" 808 belonging to the highest rank to the current concept "COMPUTER" 812 through subsumption relations in this order. Further the system displays the query expression at that time in the query editing window and a pointer (rectangular frame) 814 is attached to the series of letters "COMPUTER" 813, which is the current concept. Furthermore the system displays the concept belonging to the highest rank and concepts belonging to lower ranks in the subsumption relation, which the current concept can change, in the concept tree window 803 a pointer 816 is attached to the series of letters "COMPUTER" 815. Hereinbelow the concept belonging to the highest rank displayed in the concept tree window 803 is called anchor. As shown in this case, when no relation is added to the current concept, the anchor is "UNIVERSAL" 817. A message from the system is displayed in the system message window 804. A series of letters inputted through a keyboard is displayed in the input window 805. Since the system stores the coordinates of the series of letters representing the concepts displayed in the query editing window 802 and the concept tree window 803 in a memory, it is possible to click a series of letters representing a concept by means of a mouse and to extract the series of letters representing the concept. Information concerning the query expression displayed in the query editing window 802 is stored in the S type expression used in the LISP language. For example, when the query expression is "COMPUTER is ...", the S type expression stored in the memory is (COMPUTER (UNIVERSAL UNIVERSAL)(X1 Y1)). Here (UNIVERSAL UNIVERSAL) represents a list including the anchor by the relation added as the root and the anchor by the relation added as the condition. The anchor at the subsumption relation display is a subconcept of the two anchors. (X1 Y1) represents the X and Y coordinates of the displayed series of letters "COMPUTER". The subsumption relation is stored in the memory in the form of a list of the displayed concept and concepts one layer below. When a concept having a plurality of concepts one layer above, the relevant concept is connected with all the concepts one layer above by using lines.

The modification of the current concept can be effected by selecting a concept displayed in the query editing window 802 and the concept tree window 803 by means of the mouse or by inputting data through the keyboard. When the user effects an input through the keyboard, the system queries a concept among the subconcepts of the anchor displayed in the concept tree window 803. When the concept extracted by the input through the keyboard is not displayed in the concept tree window 803, the system examines the superconcepts thereof to store the subsumption relations in the memory and at the same time displays them combined with the subsumption relation tree. Every time the current concept is changed, the system displays newly the superconcepts of the new current concept in the superconcept window 801, replaces the current concept 813 in the query expression by the new current concept in the query editing window 802 and moves the pointer 816 for the current concept to the new current concept in the concept tree window 803.

Figure 18:
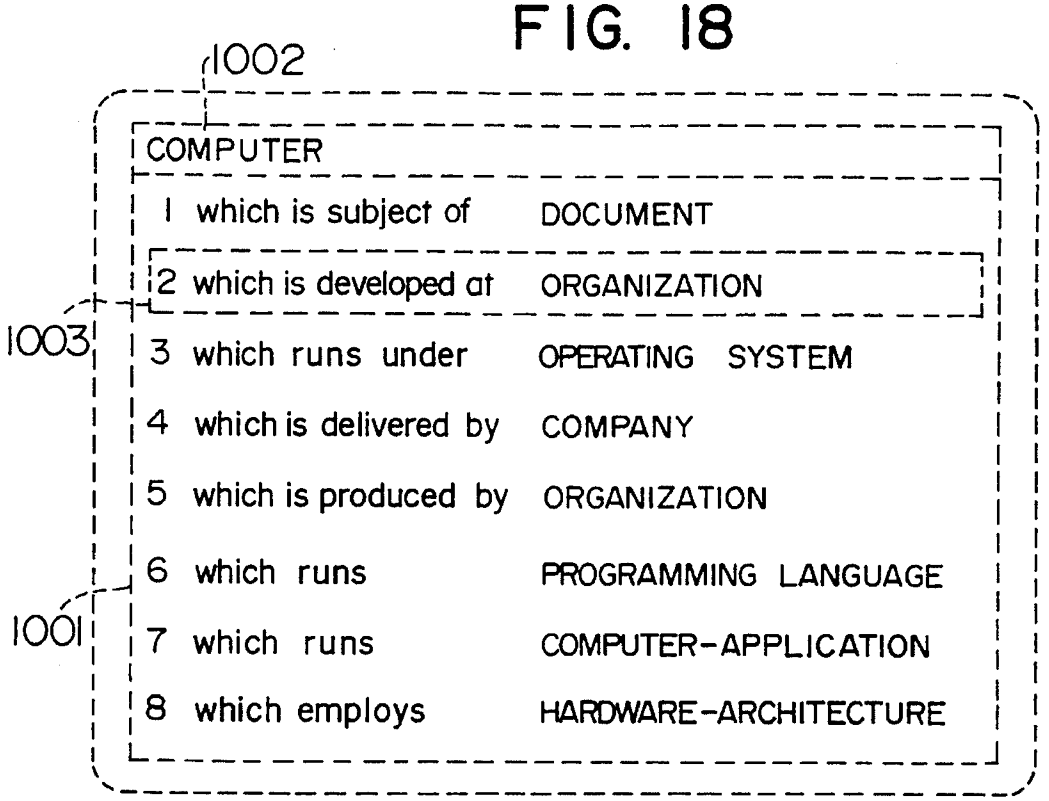
FIG. 18 shows an example of the table added, when conditions are added.

Addition of query conditions moves the current concept to another concept, to which the user desires to add the conditions. Then, when the user clicks the series of letters 813 of the current concept by means of the mouse in the query editing window 802, since the system displays a table of the conditions, which can be added, by the pop-up menu. The addition of the query conditions can be affected by the user by selecting one among them. 1001 in FIG. 18 is a frame for the conditions, which can be added and which is delayed, when the series of letters "COMPUTER" 813, which is the current concept, is clicked by means of the mouse. FIG. 18 is a display of a table of the concepts connected through generic relationships with "COMPUTER" 1002 or superconcepts in the subsumption relations with "COMPUTER" 1002, i.e. "COMPUTER" 812 , "HARDWARE" 811, "ARTIFACT" 810, "MATTER" 809 and "UNIVERSAL" 808, and the names of the relations, in which "COMPUTER" 1002 is the principal part. "COMPUTER" 1002 in the left upper part of FIG. 18 is a concept to effect the addition of the conditions. On the left side are indicated series of letters, "COMPUTER" 1002 or superconcepts in the subsumption relations with "COMPUTER" 1002. On the left side are indicated the names of the generic relationships of the concepts on the right side, in which "COMPUTER" is the principal part. The numbers are slot numbers of this frame. The user selects a relation, which he desires to add, among them by means of the mouse. At this time, if the user selects a relation item "which is developed at ORGANIZATION" 1003, the system sets the query expression to be "COMPUTER which is developed at ORGANIZATION . . . " and the current object is moved to the added concept "ORGANIZATION" of the selected item.

Figure 19:
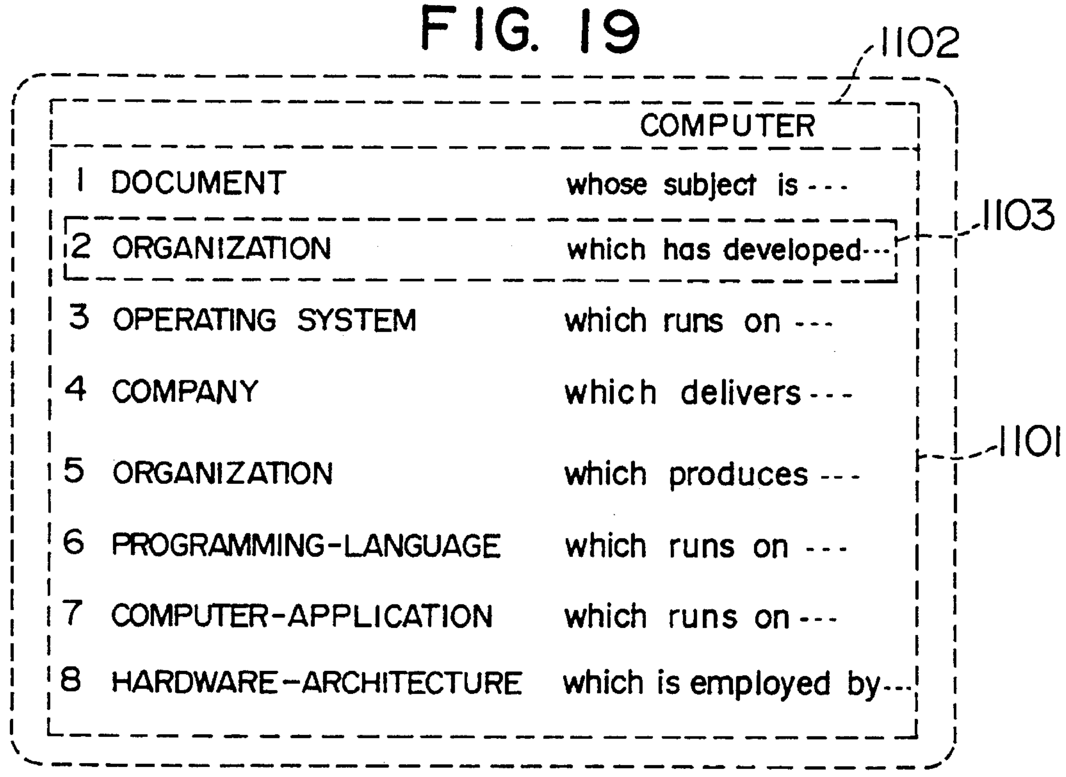
FIG. 19 shows an example of the table added, when a root is added.

It is possible to change the object of the query in the query expression. The object of the query in the query expression is one of the most important concept in the query expression, which is the principal part thereof. For example, "COMPUTER" in the query expression "COMPUTER developed at COMPANY" is the concept, which is the object of the query. At this time the modification of the object of the query is to change the object of the query to a certain concept, using the relevant concept connected with the concept, which is the object of the query, through a generic relationship, in the query expression, which has been formed. For example the object of the query is changed to "DOCUMENT" connected with the concept "COMPUTER", which is the object of the query in the query expression "COMPUTER developed at COMPANY is . . . ", which has been formed, through a relation "SUBJECT". At this time, the system sets the query expression at "DOCUMENT, whose subject is COMPUTER which is developed at COMPANY". Hereinbelow the name of the relation at this time is called "root". When the user moves the current concept to the concept, which is the object of the query at that time, and click the series of letters 813 of the current concept in the query editing window 802 by means of the mouse, since the system displays a table of roots, which can be added by the pop-up menu, it is possible for the user to change the object of the query by selecting it among them. 1101 in FIG. 19 is a frame for the root, which can be added, displayed, when the user clicks the series of letters "COMPUTER", which is the concept of the object of the query. FIG. 19 is a display of a table of the names of relations, whose principal parts are the concepts connected through generic relations with "COMPUTER" 812, "HARDWARE" 811, "ARTIFACT" 810, "MATTER" 809 and "UNIVERSAL" 808 in the superconcept window 801 in FIG. 16. "COMPUTER" 1102 in the right upper part of FIG. 19 is a concept to effect the addition of the roots. On the left side are indicated series of letters of the concepts connected through generic relationships with concepts in the higher or same ranks in the subsumption relations with "COMPUTER" 1102. On the right side are indicated the names of the generic relationships with "COMPUTER", whose principal parts are the concepts indicated on the left side. The numbers are slot numbers of this frame. The user can select a relation, which he desires to add, among them by means of the mouse. For example, when the user selects the relation "ORGANIZATION which has developed COMPUTER . . . " 1103, the system sets the query expression "ORGANIZATION which has developed COMPUTER is . . . " and moves the current concept to the added concept "ORGANIZATION" of the selected item. In this way the object of the query is set to "ORGANIZATION".

Figure 17:
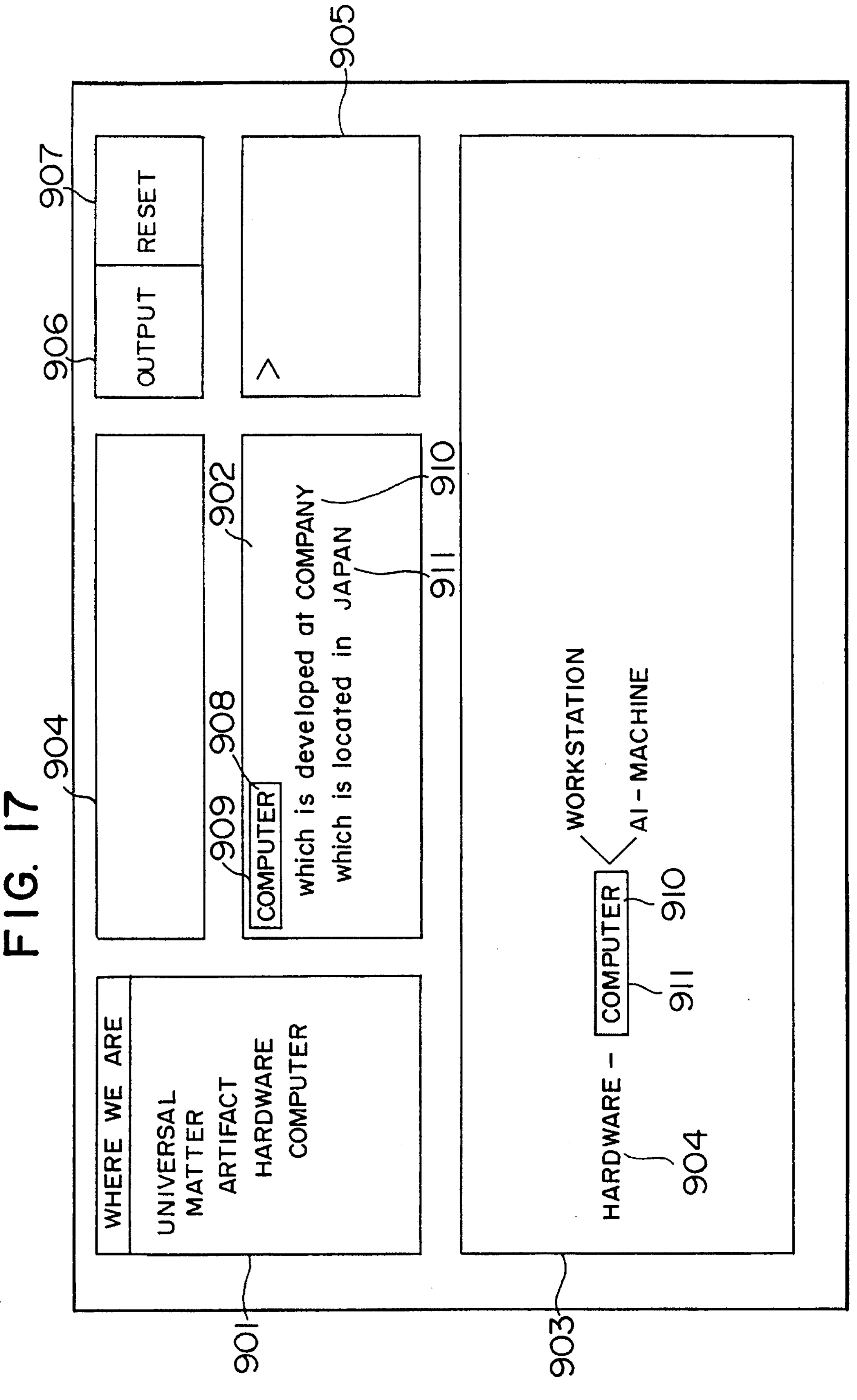

It is supposed in this way that the query expression "COMPUTER which is developed at COMPANY which is located in JAPAN . . . " has been formed. When the current concept is "COMPUTER", the image on the screen in this state is indicated in FIG. 17. The query editing window 902 displays "COMPUTER developed by COMPANY located in JAPAN is . . . ". At this time S type expressions stored in the memory are as follows;

```
(COMPUTER (UNIVERSAL HARDWARE (X1 Y1)
  ((is developed
    (COMPANY (ORGANIZATION ORGANIZATION)(X2 Y2)
  (is located in
    (JAPAN (LOCATION UNIVERSAL (X3 Y3))))))
```

(X1 Y1), (X2 Y2) and (X3 Y3) are X and Y coordinates of series of letters displayed in the query editing window 902, i e "COMPUTER" 908 , "COMPANY" 910 and "JAPAN" 911. (UNIVERSAL HARDWARE) is a list of the anchor "UNIVERSAL" when there is no relation added as a root and the anchor "HARDWARE" by the relation "DEVELOPMENT" added as a condition. In the same way (ORGANIZATION ORGANIZATION) is a list of the anchor "ORGANIZATION" by the relation "DEVELOPMENT" added as the root and the anchor "ORGANIZATION" by the relation "LOCATION" added as a condition. (LOCATION UNIVERSAL) is a list of the anchor "LOCATION" by the relation "LOCATION" added as the root and the anchor "UNIVERSAL", when there is no relation added as the condition. The user selects the series of letters representing the concepts included in the query expression displayed in the query editing window 902, i.e. "JAPAN" 911, "COMPANY" 910 and "COMPUTER" 908 by means of the mouse and in this way it is possible to attach a relation to each of these concepts, while displacing the current concept to them one after another. The anchor in the concept tree window 903 looks for concepts connected with each other through relations (conditions or roots) among current concepts or superconcepts of the current concepts, the anchor being set at the concept belonging to the lowest rank among them. In the query expression the relation "DEVELOPMENT" is jointed with the current concept as a condition. As indicated in FIG. 15, since the superconcept "HARDWARE" 712 of "COMPUTER" is connected with the superconcept "ORGANIZATION" of "COMPANY" through the relation "DEVELOPMENT" 725, the anchor is "HARDWARE" 712. The concepts following the concept "HARDWARE" 712 are displayed in the subsumption relation tree.

When the query expression is "ARTICLE concerning COMPUTER developed by COMPANY and working on OPERATING SYSTEM" and the current concept is "COMPUTER", the system displays a subsumption relation tree of the concepts matched with the query expression among the concepts following "COMPUTER". In the query expression, the relations "DEVELOPMENT", "OS" and "SUBJECT" are connected with the current concept "COMPUTER". As indicated in FIG. 15, "COMPUTER" 713 is connected with "OPERATING SYSTEM" 717 through the relation "OS" 726; "HARDWARE" 712 is connected with "ORGANIZATION" 707 through the relation "DEVELOPMENT" 725; and "UNIVERSAL" 701 is connected with "DOCUMENT" 720 through the relation "SUBJECT" 727. Therefore the system sets the anchor at "COMPUTER" 713, which is the concept belonging to the lowest rank among "COMPUTER" 713, "HARDWARE" 712 and "UNIVERSAL" 701.

Further the user can effect a search on "COMPANY located in JAPAN", "COMPUTER developed by COM- PANY located in JAPAN", etc. by clicking a "command menu for retrieval output" 906 after moving the current concept to a series of letters of a concept "JAPAN" 911, "COMPANY" 910 or "COMPUTER" in the query editing window 902 in FIG. 17.

Figure 20:
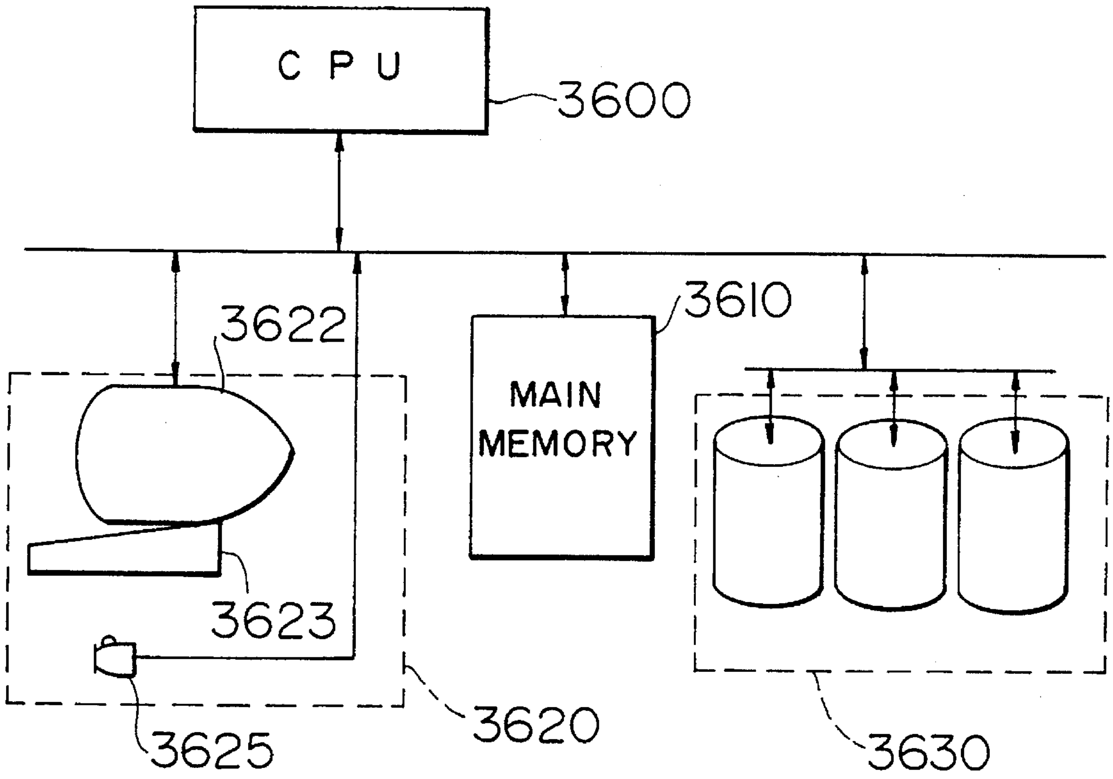
FIG. 20 is a scheme illustrating the construction of a system according to this invention.

FIG. 20 is a scheme illustrating the construction of a filing system using an information querying device, which is an embodiment of the system according to this invention. The outline of the construction and the operation of the whole device will be explained below.

The device consists of a central processing unit (CPU) 3600 and a dataprocessor unit comprising a main memory 3610, magnetic disk storage units 3630, a terminal 3620, a CRT 3622, a keyboard 3623 and a mouse 3625. The query of concepts is effected on the terminal 3620. The object of the query is registered concepts and an assembly of facts described as relations between different concepts, which are stored in a file 3630. Further knowledge concerning natural languages expressing the concepts and the relations is also contained in the file 3630. The control of a window in the terminal 3620 is effected by the central processing unit 3600. The concepts and the menu displayed on the CRT 3622 can be selected by using the mouse 3625 on the CRT 3622. By using this function it is possible to browse freely data without relying on the input through the keyboard. The control of the screen on the CRT 3622 is effected by the CPU 3600.

Principal operations of the device will be explained below. When the query of the knowledge base is started, a window necessary for the display of the knowledge base is displayed on the CRT 3622. At this time the mouse 3625 is clicked and location information, which it is desired to take out, is stored in the main memory 3610. When the mouse 3625 is clicked, the location thereof is examined and the clicked series of letters is taken out, referring to the location information stored in the main memory 3610. Further, when the mouse 3625 is clicked or data are inputted through the keyboard 3623, the central processing unit 3600 looks for a window, in which the display is to be rewritten, and necessary information is looked for from the magnetic disk 3630 and displayed.

Hereinbelow this invention will be explained concretely, taking a query expression "DOCUMENT, whose SUBJECT is COMPUTER developed by COMPANY located in JAPAN" as an example and referring to FIGS. 16, 17 and 21 to 32.

Figure 21:
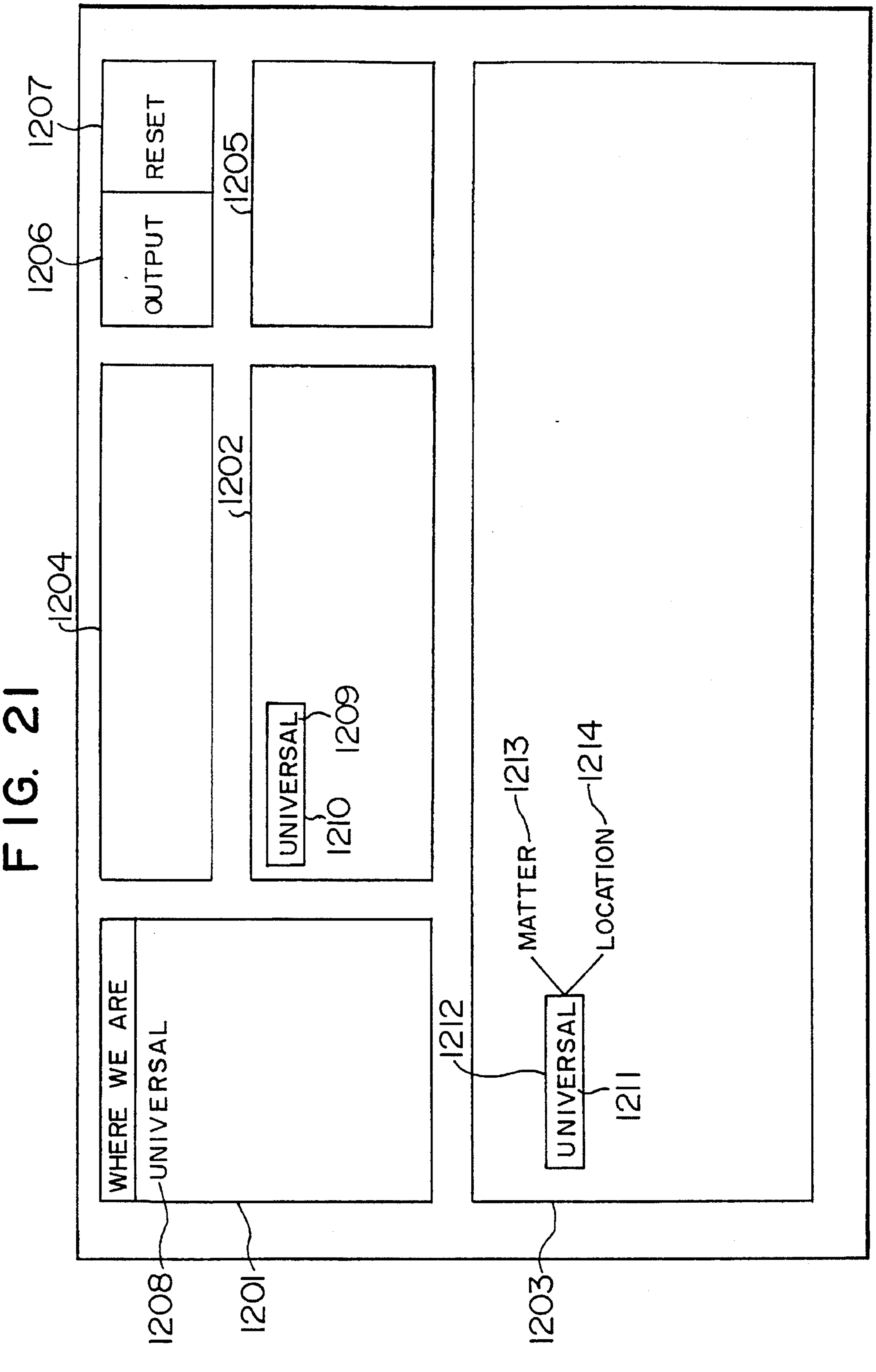
FIGS. 21 to 32 show images on the screen appearing in the process of a query of information.

FIG. 21 shows an initial image on the screen at the starting of a query. This initial image is obtained, when the reset menu 1207 is clicked. The current concept is "UNIVERSAL", which is the concept belonging to the highest rank. The series of letters "UNIVERSAL" 1208 of the concept "UNIVERSAL" is displayed in the superconcept window 1201. In the query editing window 1202 the series of letters "UNIVERSAL" 1209 is displayed and a pointer (rectangular frame) 1210 is located there. In the concept tree window 1203 the anchor is "UNIVERSAL" and the concepts m layers below are displayed up to a branch n in the form of a tree. The pointer 1212 is located at the series of letters "UNIVERSAL" 1211. The user can change freely the values of m and n at any time. In the following example, it is supposed that m=1 and n=2. In the concept tree window 1203 the current concept is moved to concepts, for which no subconcepts are displayed, i.e. "MATTER" 1213, "LOCATION" 1214. When there exist subconcepts of the relevant current concept, concepts one layer below are added thereto and concepts up to the branch 2 are displayed in the form of a tree.

Figure 33:
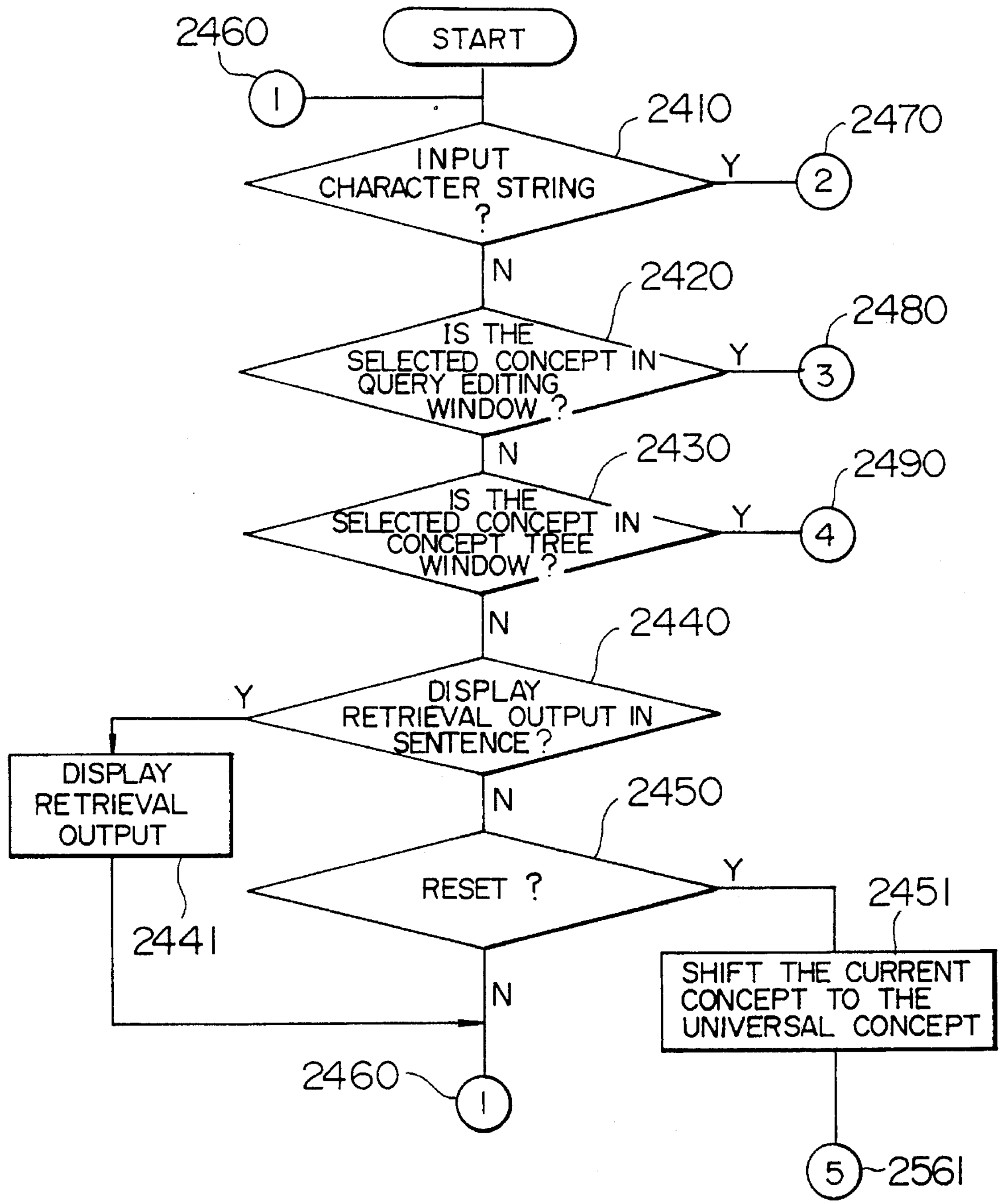
FIGS. 33 to 36 are flow charts for the processing according to this invention.
Figure 34:
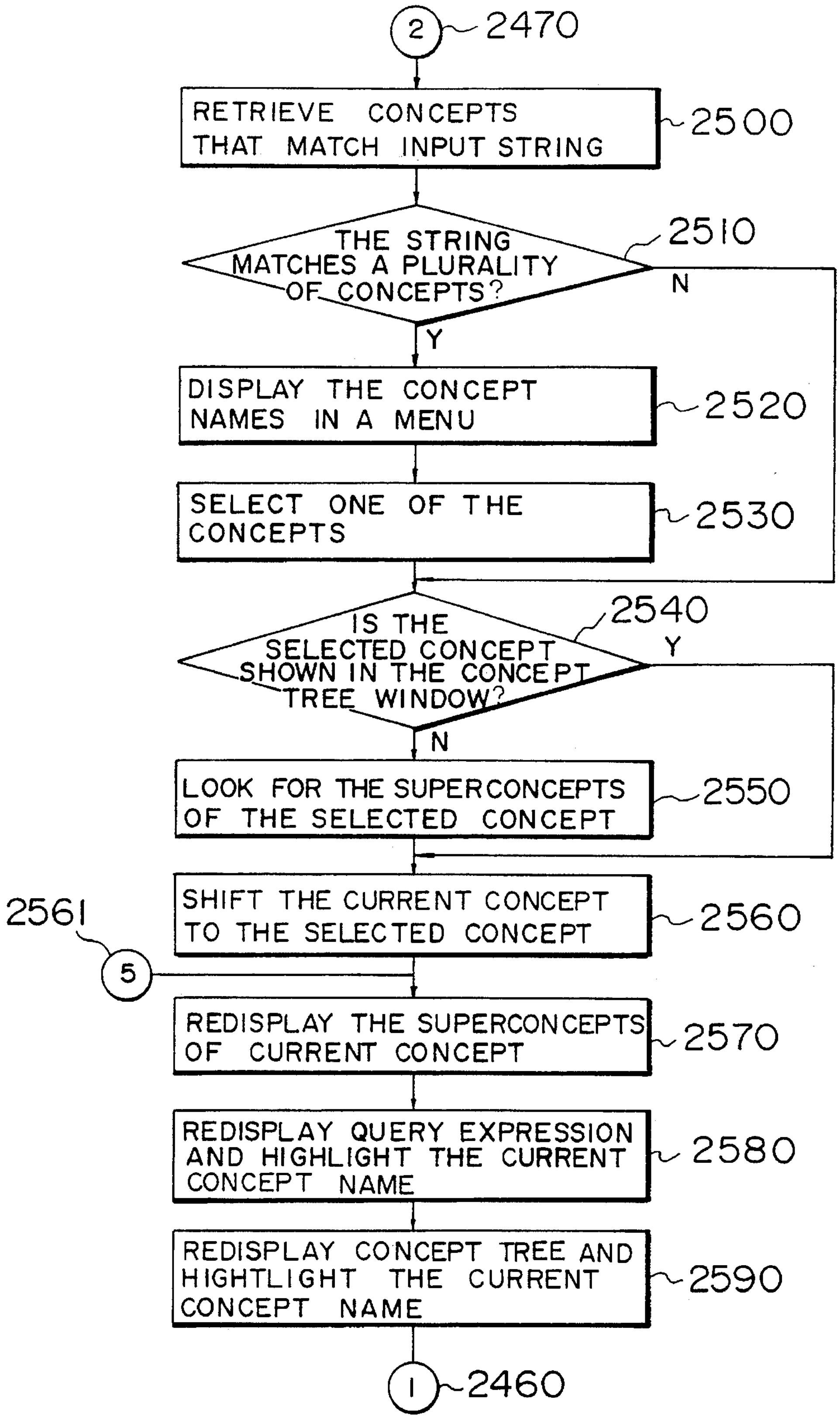

FIG. 16 shows an image, in the case where "computer" is inputted through the keyboard in FIG. 21. and the current concept is changed. It is possible to move the current concept by selecting a concept by means of the mouse or by inputting data through the keyboard. When "computer" is inputted through the keyboard, a concept matching is effected and "COMPUTER" is obtained as the retrieval output. When a plurality of concepts are extracted since the extracted concepts are displayed in a menu together with the concepts one layer above of each of the concepts, it is possible to decide the current concept unambiguously by selecting one of them by means of the mouse. Since the concept "COMPUTER" extracted here is not queried previously and it is not displayed in the concept tree window 1203 indicated in FIG. 21, at first the superconcepts of the concept "COMPUTER" are examined so as to link the concepts displayed in the concept tree window 1203 with "computer" through subsumption relations. The concept "COMPUTER" is selected as the current concept. Since the current concept has moved to "COMPUTER", the superconcept window 801 is rewritten to the superconcept of "computer". In the query editing window 802 the part 813 of the current concept in the query expression is replaced by "COMPUTER" and displayed again. The pointer 814 is located at the series of letters "COMPUTER" 813. In the concept tree window 803, since no restrictions are imposed to the current concept, the anchor is "UNIVERSAL" 812. The concepts up to "COMPUTER", a concept one layer below "WORKSTATION" 819 of "COMPUTER" and "AI MACHINE" 818 are displayed in the form of a tree and the pointer 816 is located at the series of letters "COMPUTER" 815. The flow of the processing from FIG. 21 to FIG. 16 is indicated in FIGS. 33 and 34. FIG. 33 is a flow chart of the processing to judge to which processing the procedure should proceed. In Step 2410, it is judged whether data are inputted through the keyboard or not. In Step 2420, it is judged whether the series of letters of the concept displayed in the query editing window is selected by the mouse or not. In Step 2430, it is judged whether the series of letters of the concept displayed in the concept tree window is selected by the mouse or not. In Step 2440, it is judged whether a command menu for retrieval output is selected by the mouse or not. When the command menu for retrieval output is selected, the retrieval output is expressed in the form of a sentence in Step 2441. In Step 2450, it is judged whether the reset menu is selected by the mouse. When the reset menu is selected, the current concept is the concept belonging to the highest rank "UNIVERSAL" in the subsumption relation in Step 2451. FIG. 34 is a flowchart of the processing executed when a series of letters is inputted through the keyboard. Step 2500 executes matching of the concept corresponding to the inputted series of letters. Here partial matching by a partial string is also executed. In Step 2510, it is judged whether there are a plurality of matched concepts or not. If there are a plurality of matched concepts, in Step 2520, the matched concepts and the superconcepts of each of the concepts are displayed in the form of a table by the pop-up menu. In Step 2530, one relevant concept is selected by means of the mouse. In Step 2540, it is judged whether the matched concepts are displayed in the concept tree window or not. In the case where they are not displayed, the superconcepts of the relevant concepts are examined. In Step 2560, the matched concepts are current concepts. In Step 2570, the superconcepts of the concept, which is a new concept, are displayed again in the superconcept window. In Step 2580, the query expression is displayed again in the query editing window and the pointer is located at the current concept. The concept tree made by subsumption relations is displayed again in the concept tree window and the pointer is located at the current concept. Until the image indicated in FIG. 21 is changed to that indicated in FIG. 16, in order to move the current concept to the concept represented by the series of letters inputted through the keyboard, the process proceeds to Step 2410 in FIG. 33, then to Step 2500 in FIG. 34, as indicated by a joiner 2470. Then the processings in Steps 2510, 2540, 2550, 2560, 2570, 2580 and 2590 are executed one after another and return to Step 2410 in FIG. 33 through a joiner 2460.

Figure 22:
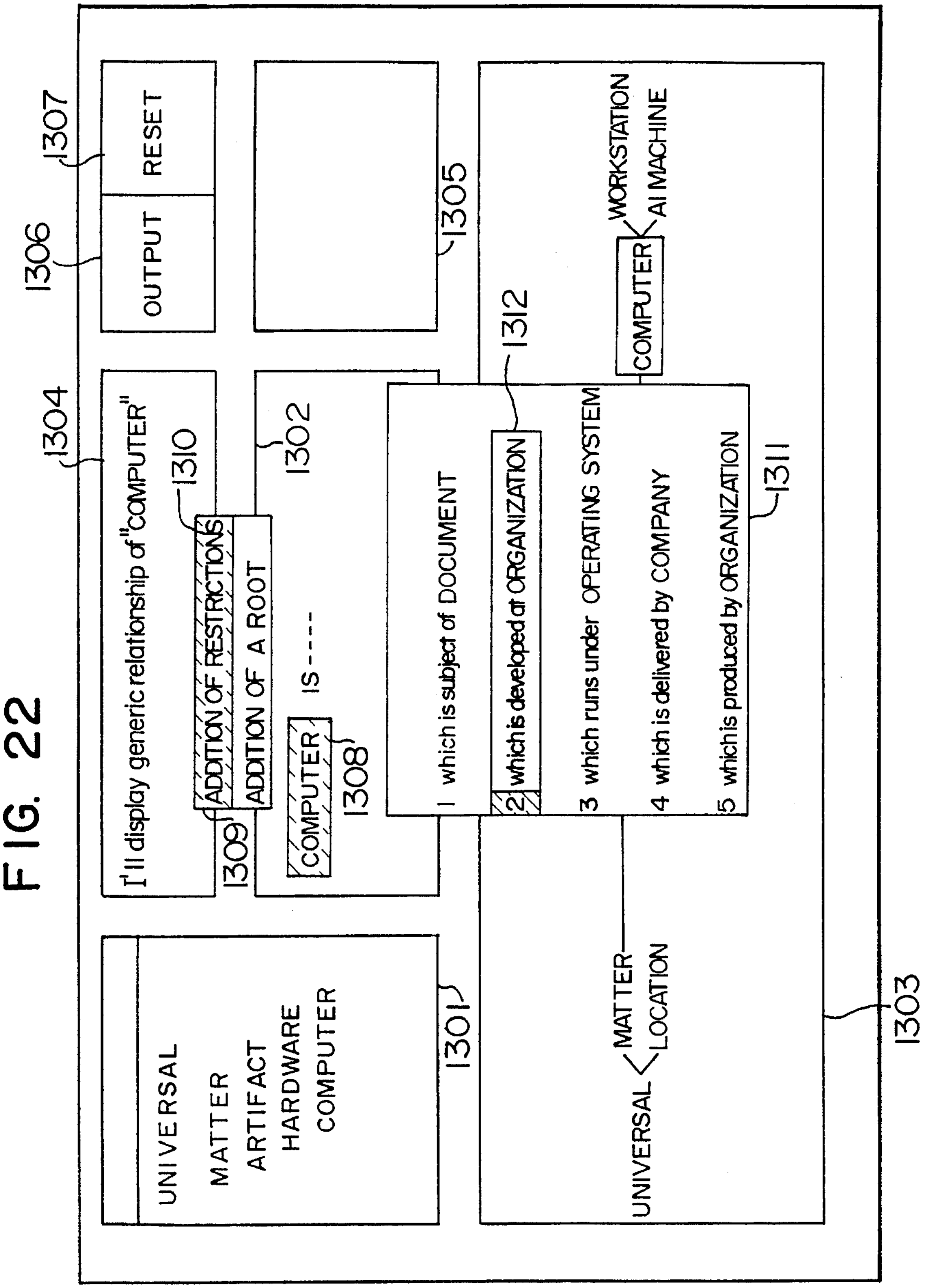
Figure 23:
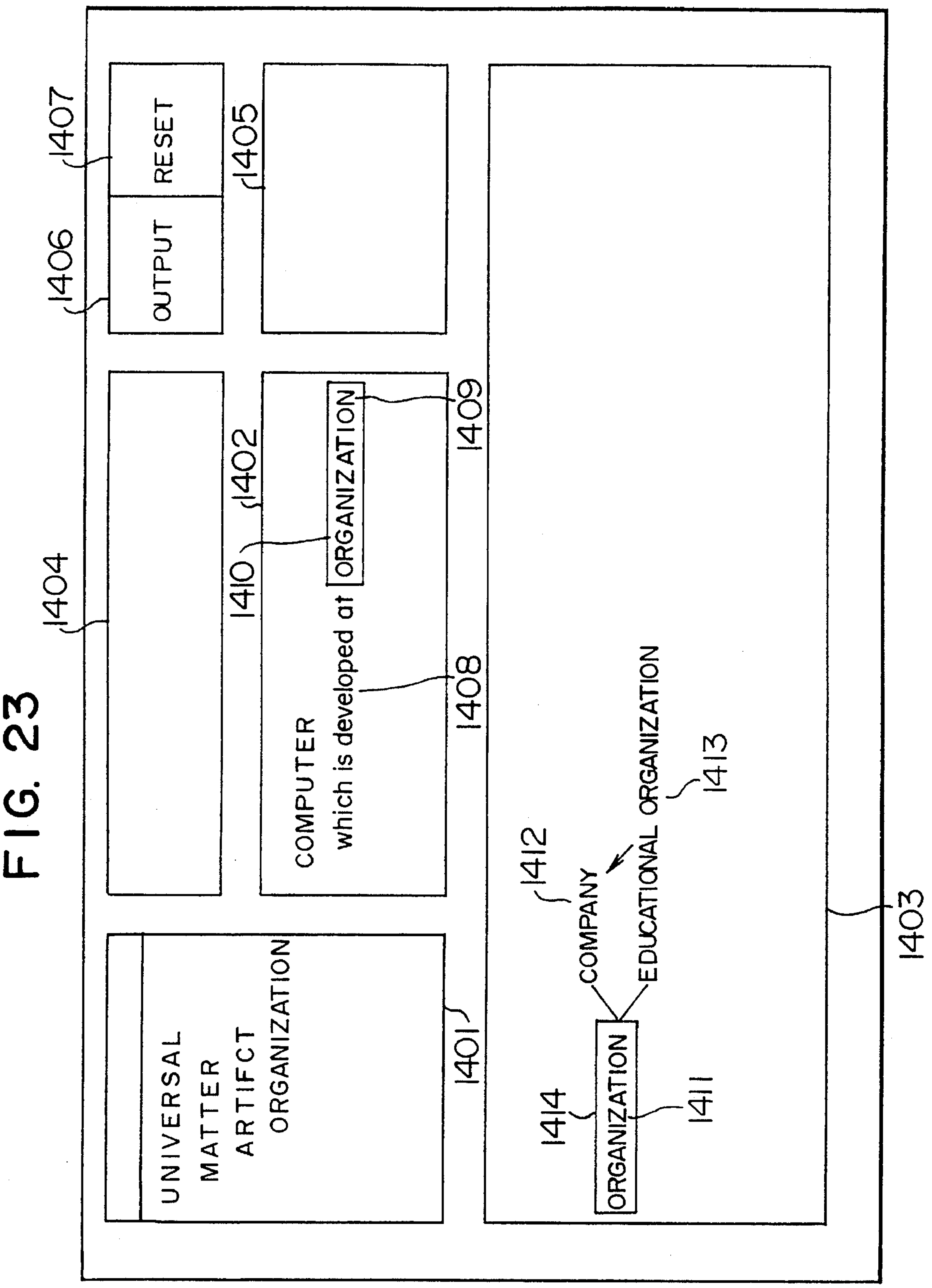
Figure 35:
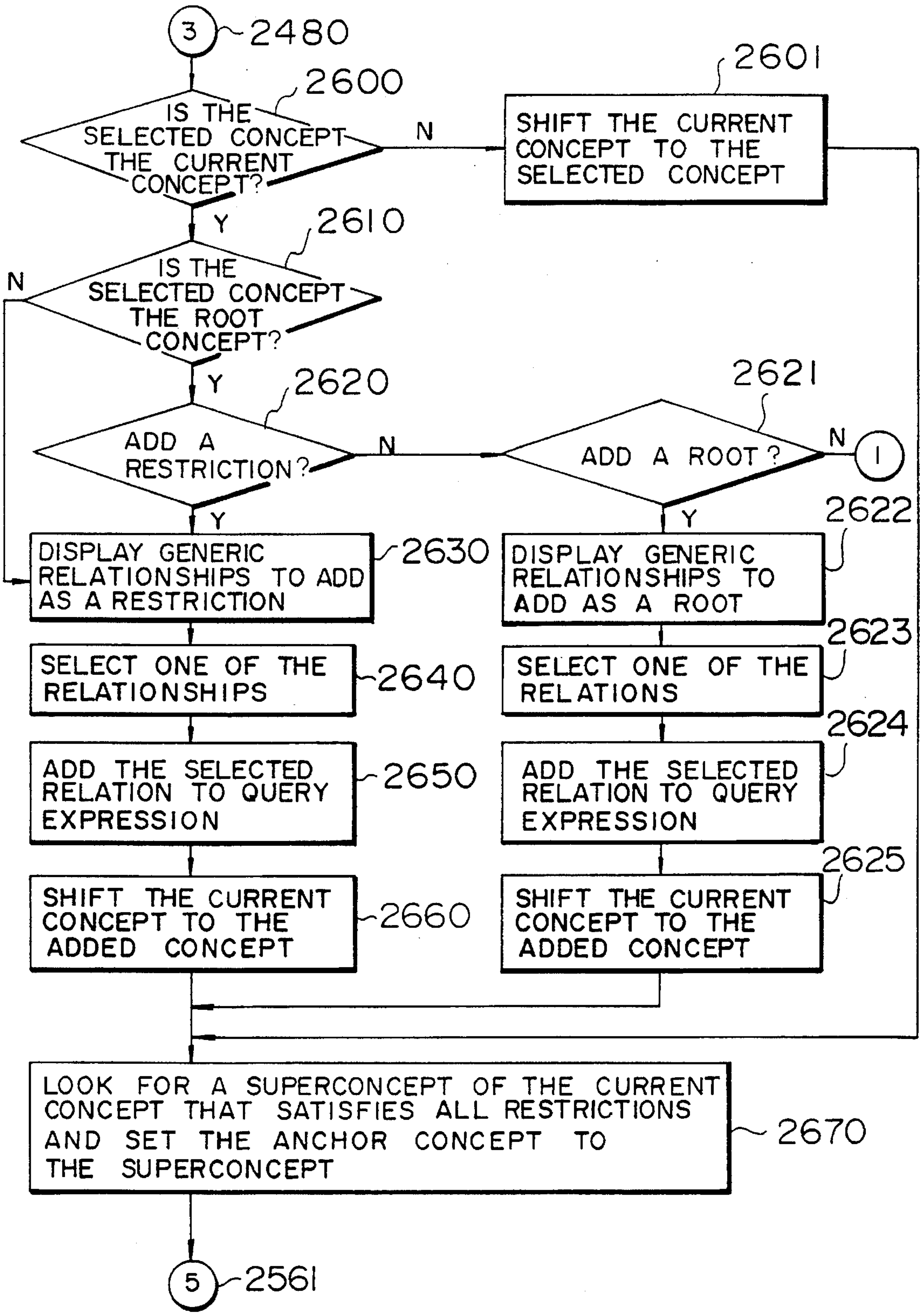

It is possible to impose restrictions to the current concept by clicking the series of letters of the current concept in the query editing window by means of the mouse. FIG. 22 is an image in the course of this process. When the series of letters of the current concept "COMPUTER" 1308 in the query editing window 1302 is clicked by means of the mouse, since the concept "COMPUTER" is the current concept and the concept, which is the object of the query in the query expression, the pop-up menu 1309 appears, for selecting whether a condition or a root should be added to the current concept. Here, when "addition of restrictions" 1310 is selected, the system displays the generic relationships, which can be added to "COMPUTER", including the conception, whose superconcepts are acceptable, in the frame 1311. Once the generic relationships, which can be added to the current concept, have been found and displayed, since those data or the displayed window is stored in the interior, it is not necessary to query again the relations, which can be added to the same concept. The user selects one of them by clicking the relevant relational item "COMPUTER developed by ORGANIZATION". FIG. 23 shows an image, after the relation, for which it is desired to be added, has been selected. The relevant relation is added to the query expression, which is changed into "COMPUTER developed by ORGANIZATION" 1408 and the current concept is moved to the superconcept "ORGANIZATION" in the relation item "COMPUTER developed by ORGANIZATION". The query expression is displayed again in the query editing window 1402 and the pointer 1410 is located at the series of letters "ORGANIZATION" 1409 of the current concept. In the concept tree window 1403, the anchor is the superconcept "ORGANIZATION" connected with "COMPUTER" through the relation "DEVELOPMENT". "ORGANIZATION" 1411 and the series of letters "COMPANY" 1412, "EDUCATIONAL ORGANIZATION" 1413 of the concepts, which are subconcepts one layer below of "ORGANIZATION" up to the branch 2 are displayed in the form of a tree and the pointer is located at the series of letters "ORGANIZATION" 1411. The flow of the processing, until the image is changed from FIG. 16 to FIG. 23, is indicated in FIGS. 33 and 35. FIG. 35 is a flow chart of the processing for imposing restrictions or adding roots to the current concept. In Step 2600, it is judged whether the concept represented by the series of letters specified by the mouse on the query editing window is in accordance with the current concept or not. If the selected is not the current concept, the specified concept is made to be the current concept in step 2601. In Step 2610, it is judged whether the current object is the concept, which is the object of the query in the query expression. When it is the object of the query, in Step 2620, it is judged whether restrictions should be imposed thereto or not and in Step 2621, it is judged whether a root is added thereto or not. In the case where restrictions should be imposed thereto, in Step 2630, a table of generic relationships, which can be imposed to the current concept as restrictions, is displayed. In Step 2640, relevant relations are selected in the displayed table. In Step 2650, the restrictions are imposed to the query expression and in Step 2660, the superconcepts of the selected relation item are made to be the current concept. In the case where the root is added thereto, in Step 2622, a table of generic relationships, which can be added to the current concept as a root, is displayed. In Step 2623, a relevant relation is selected in the displayed table. In Step 2624, the root is added to the query expression and in Step 2625, the subconcepts of the selected relation item are made to be the current concept. In Step 2670, the superconcepts of the current concept having relations (restrictions and root) added to the current concept are examined, the anchor being the concept belonging to the lowest rank therein. Until the image indicated in FIG. 16 is changed to that indicated in FIG. 23, in order to impose restrictions to the current concept, the process proceeds to Steps 2410 and 2420 in FIG. 33, and then to Step 2600 in FIG. 35 as indicated by a joiner 2480. Then the processings in Steps 2610, 2620, 2630, 2640, 2650, 2660 and 2670 are executed one after another. Further, as indicated by a joiner 2561, the processings in Steps 2570, 2580 and 2590 are executed and the process returns to Step 2410 in FIG. 33 through a joiner 2460.

Figure 24:
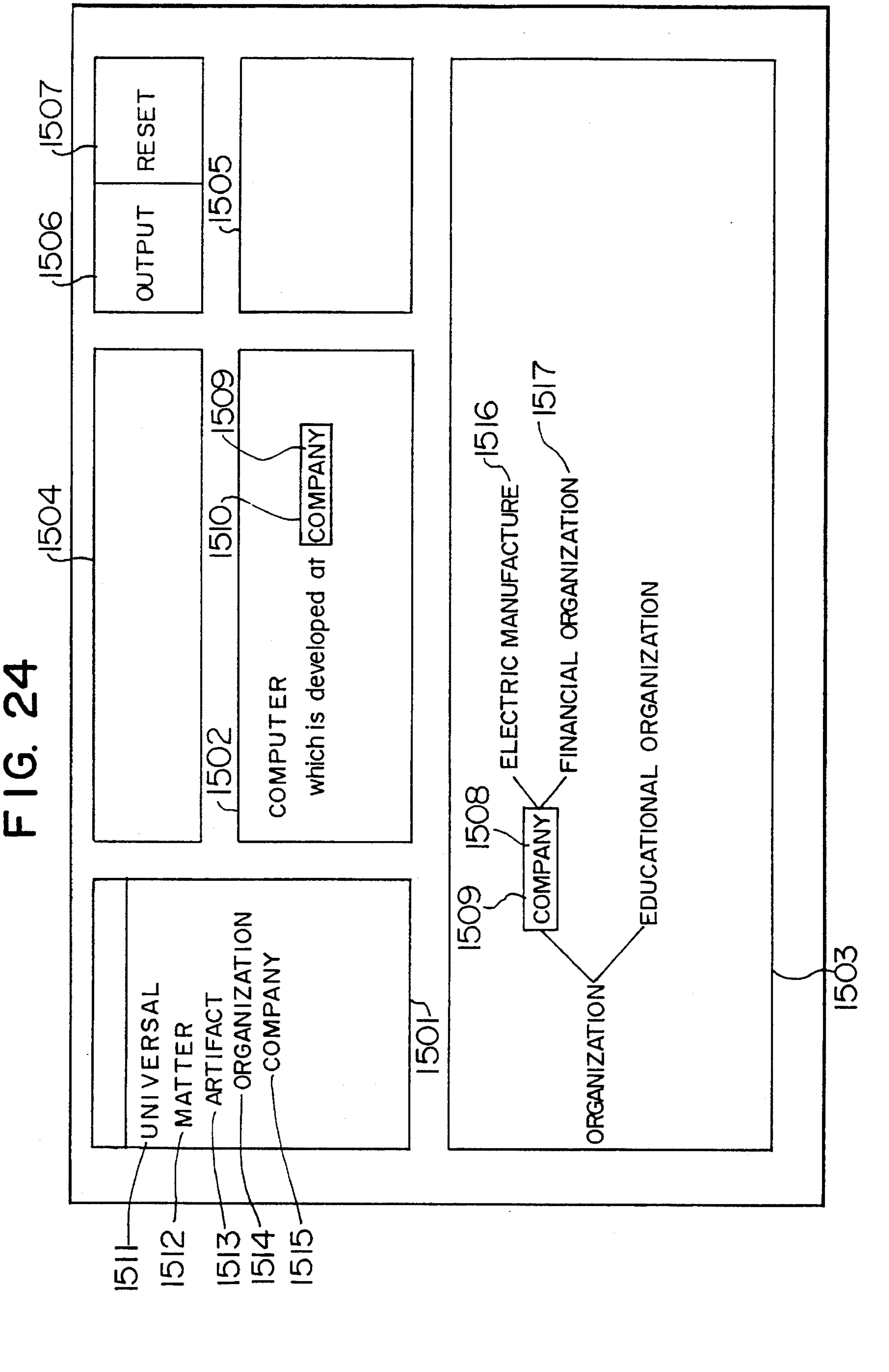
Figure 36:
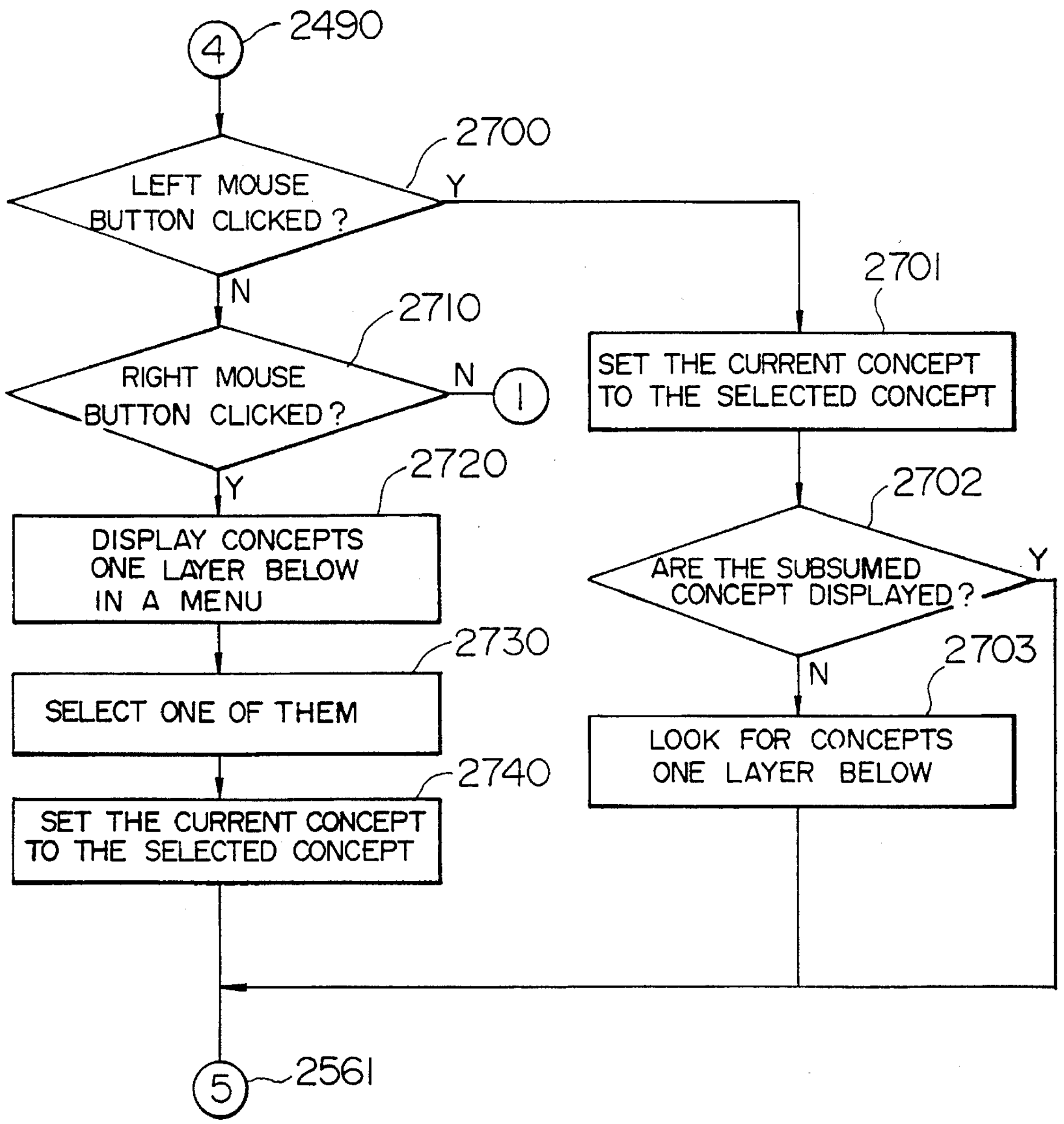

It is possible to change successively the current concept by selecting series of letters of the concepts in the concept tree window. At this time, since it is desired to examine "COMPUTER developed by COMPANY", in FIG. 23, the series of letters "COMPANY" 1412 displayed in the concept tree window 1403 is clicked by the left button of the mouse to move the current concept to "COMPANY". FIG. 24 shows the image on the screen in this state. Since the current concept has been moved to the concept "COMPANY", the superconcept window 1501 is rewritten to be changed to the superconcepts of "COMPANY" and "UNIVERSAL" 1511, "MATTER" 1512, "ARTIFACT" 1513, "ORGANIZATION" 1514 and "COMPANY" 1515 are displayed, as indicated in the figure. In the query editing window 1502, the query expression "COMPUTER developed by COMPANY" 1508 is displayed again and the pointer 1510 is located at the series of letters "COMPANY" 1509 of the current concept. In the concept tree window 1503, the pointer 1509 for the current concept is moved to "COMPANY" 1508. Since the relevant concept "COMPANY" clicked by the left button of the mouse is the concept belonging the lowest rank in the concept tree window 1403 indicated in FIG. 23, further the subconcepts one layer below up to the branch 2 are searched and added to be displayed in the form of a tree. At this time, either the whole concept tree made by subsumption relations may be displayed by moving the pointer for the current concept to "COMPANY" 1508, a subconcept of "COMPANY" 1508, i.e. "ELECTRIC MANUFACTURE" 1516 or "FINANCIAL ORGANIZATION" 1517, may be added and displayed. In the case where, when it is added and displayed, it is superposed on the display of another concept, only the window for the concept, which is added and displayed, i.e. the window, where "ELECTRIC MANUFACTURE" 1516 or "FINANCIAL ORGANIZATION" 1517 is displayed, may be added and displayed after having been once erased. It is also possible to move further the current concept to a subconcept of "COMPANY" or to a superconcept thereof or another concept belonging to the same rank in the concept tree window 1503. While moving the current concept, the number of concepts displayed in the concept tree window 1503 increases and thus it is possible for the user to see the concepts, which he has followed. Further, since a concept, which has been once displayed, is memorized, it is not necessary to query it again. The processings, until the image indicated in FIG. 23 is changed to that indicated in FIG. 24, are indicated in FIGS. 33 and 36. FIG. 36 is a flow chart indicating the processing for moving the current concept, using the concept tree made by subsumption relations displayed in the concept tree window. In Step 2700, it is judged whether the series of letters displayed in the concept tree window is clicked by the left button of the mouse or not. In the case where it is clicked by the left button of the mouse, the concept clicked instep 2701 is made to be the current concept and it is judged whether the subconcepts of the concept clicked in Step 2702 are displayed or not. When they are not displayed, in Step 2703, the subconcepts one layer below are examined. In Step 2710, it is judged whether the series of letters displayed in the concept tree window is clicked by the right button of the mouse or not. In the case where it is clicked by the right button of the mouse, in Step 2720, the subconcepts one layer below the clicked concept are menu-displayed. When, in Step 2730, a relevant concept thereof is selected by means of the mouse, in Step 2740 the relevant concept is made to be the current concept. Until the image indicated in FIG. 23 is changed to that indicated in FIG. 24, in order to move the current concept to a concept, whose subconcepts are not displayed, the processings in Steps 2410, 2420 and 2430 are effected and the process proceeds to Step 2700 in FIG. 36 by a joiner 2490. The processings in Steps 2701, 2702 and 2703 are effected one after another. Further, as indicated by the joiner 2561, the process proceeds to Step 2570 in FIG. 34. Finally the processings in Steps 2580 and 2590 are effected and the process returns to Step 2410 in FIG. 33 by a joiner 2460.

Figure 25:
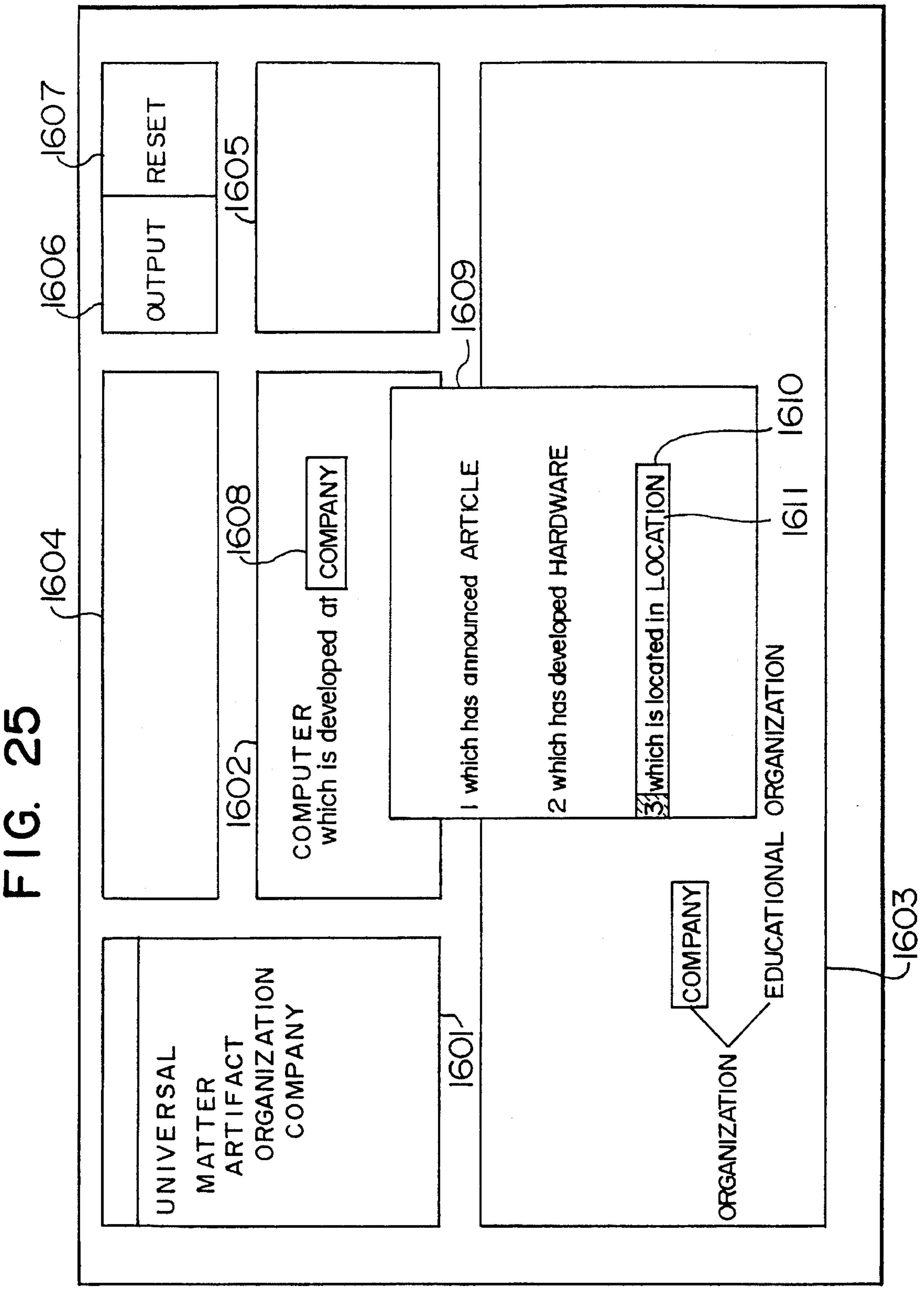
Figure 26:
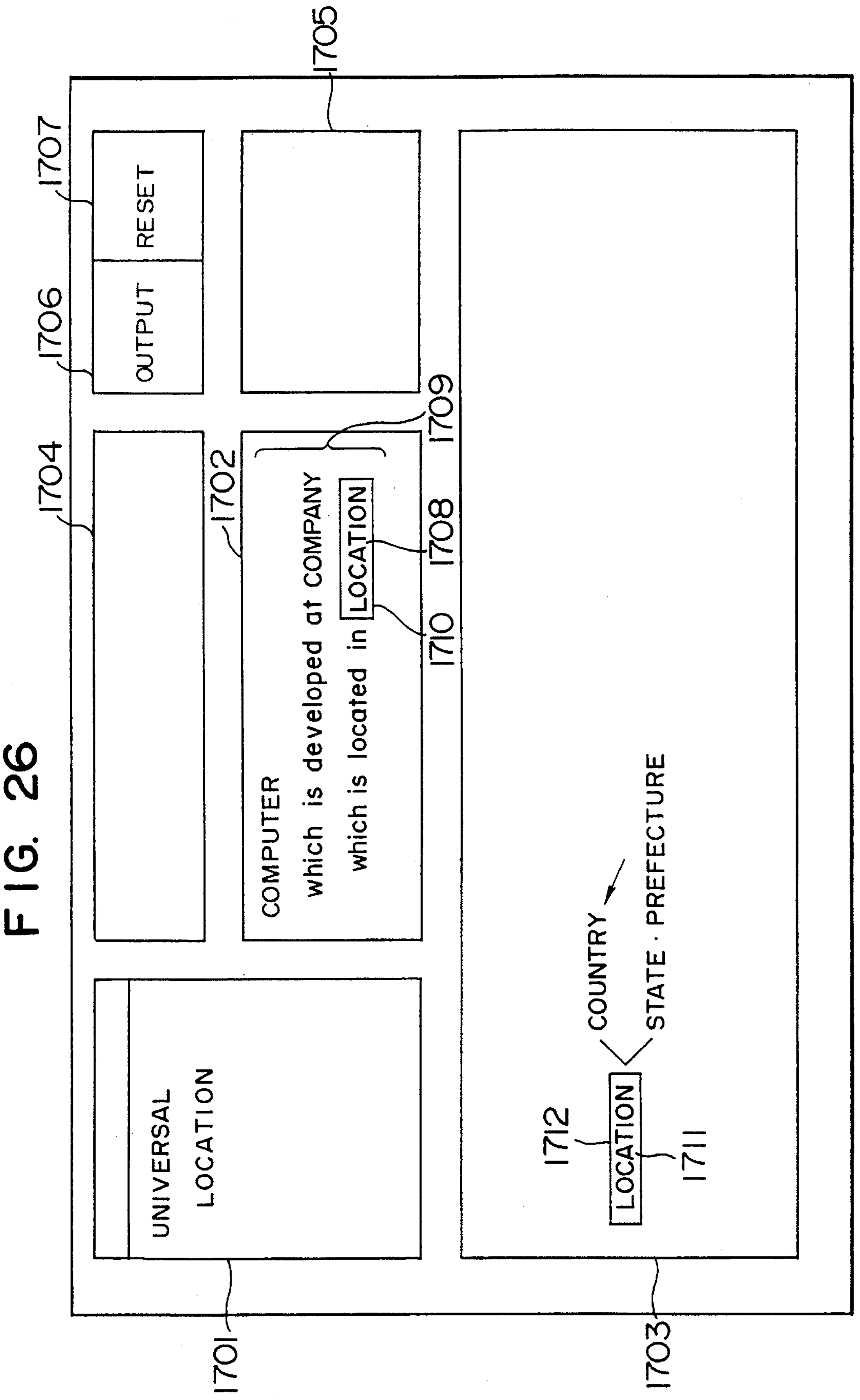

Further, since there are restrictions, which are to be imposed to the current concept "COMPANY", the processings similar to those described above are effected. FIG. 25 shows an image in the course of this process. When the series of letters "COMPANY" 1608 of the current concept is clicked, the frame 1609 of the generic relationships is displayed. Among them the relevant relation item "COMPANY located at LOCATION" 1610 is selected by means of the mouse. FIG. 26 shows an image after having selected the relation, for which it is desired to be added. The relevant relation being added to the query expression, the current concept is moved to a superconcept "LOCATION" in the relation item "COMPANY located at LOCATION". Since the current concept has moved to the concept "LOCATION", the superconcept window 1601 described above is rewritten to a superconcept of "LOCATION". In the query editing window 1702 the query expression is changed to "COMPUTER WHICH IS DEVELOPED AT COMPANY which is located in LOCATION" 1709 to be displayed again and the pointer 1710 is located at the series of letters "LOCATION" 1708 of the current concept. In the concept tree window 1703, the anchor is the "LOCATION" LOCATION connected with "COMPUTER" through the relation "DEVELOPMENT". The subconcepts one layer below of "LOCATION" is displayed up to a depth 2 in the form of a tree and the pointer 1712 is located at the series of letters "LOCATION" 1711. The flow of the processing, until the image indicated in FIG. 24 is changed to that indicated in FIG. 33 is indicated in FIGS. 33 and 35. Until the image indicated in FIG. 24 is changed to that indicated in FIG. 26, in order to impose restrictions to the concept, which is not object of the relevant concept, the processings in Steps 2410 and 2420 in FIG. 33 are effected. The process proceeds to Step 2600 in FIG. 35, as indicated by a joiner 2480. Then the processings in Steps 2610, 2630, 2640, 2650, 2660 and 2670 are effected one after another. The process proceeds to Step 2570 in FIG. 34, as indicated by a joiner 2561. Finally the processings in Steps 2580 and 2590 are effected and the process returns to Step 2410 by a joiner 2460.

Figure 27:
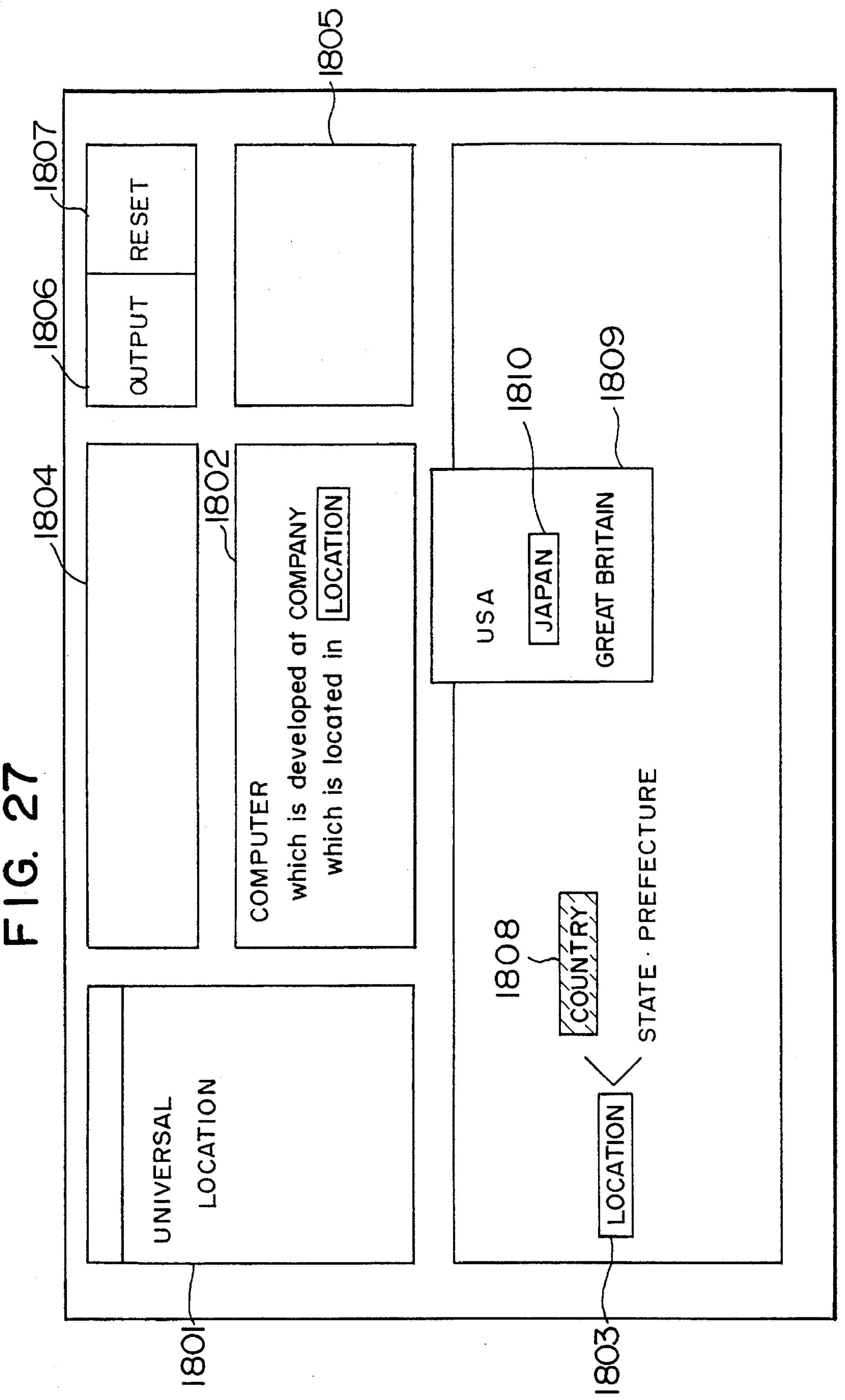
Figure 28:
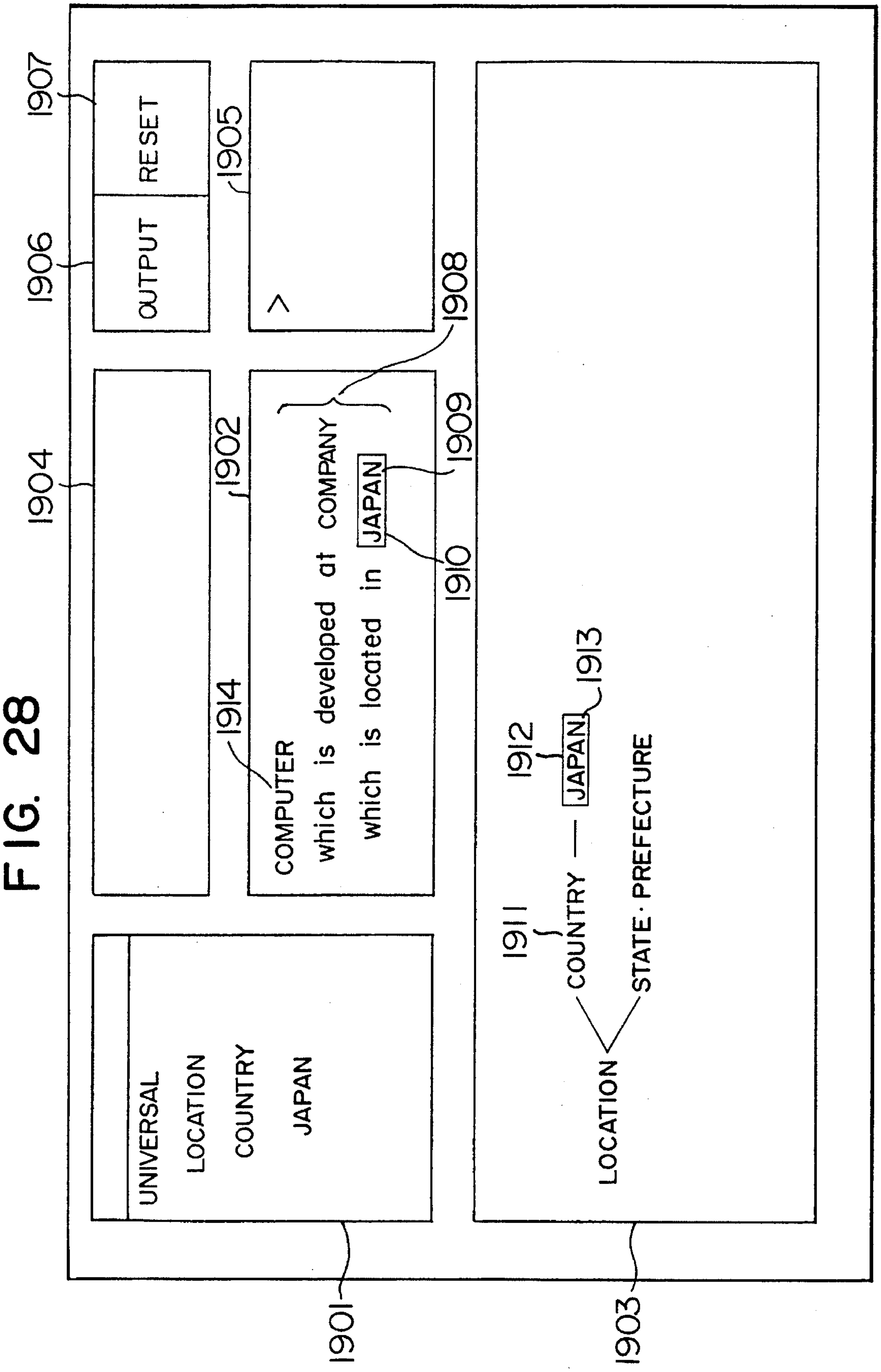

The current concept can be changed by selecting the concepts in the concept tree window by means of the mouse, the concepts displayed in the concept tree window being a part of the subsumption relation ships. FIG. 27 indicates the anchor and the following concepts in the concept tree window 1703 in FIG. 26 and represents the process for looking for concepts, which are not displayed in the concept tree window 1703, by means of the mouse. It is possible to display all the subconceptions of the relevant concept by selecting the concepts on the concept tree window 1803 by means of the right button of the mouse. Here, since it is desired to examine "COMPANY DEVELOPED BY COMPUTER located in JAPAN", when the series of letters "COUNTRY" 1808 in the concept tree window 1803 is clicked by the right button of the mouse, the subconcepts one layer below of the concept "COUNTRY" are displayed in a menu 1809. When "JAPAN" 1810, which is the concept corresponding thereto among them, is clicked, the current concept is moved to the relevant concept "JAPAN". When a concept outside of the menu domain is clicked the current concept is moved to the concept "COUNTRY". FIG. 28 is an image, after the current concept has been moved to "JAPAN". Since the current concept has been moved to the concept "JAPAN", the superconcept window 1901 is rewritten to be changed to the superconcept of "JAPAN". In the query editing window 1902 the query expression, which is "COMPUTER developed at COMPANY located in JAPAN" 1908, is displayed again and the pointer 1910 is located at the series of letters "JAPAN" 1909 of the current concept. In the concept tree window 1903, "JAPAN" 1912 is added and displayed again under "COUNTRY" 1911 and the pointer 1913 is moved to the current concept "JAPAN" 1912. The subconcepts are displayed by clicking a concept in the middle course of the relational tree displayed in the concept tree window 1903 by means of the middle button of the mouse, the current concept is moved to one of the concepts therein, and at the same time the relevant concept is added and displayed. The flow of the processing until the image indicated in FIG. 26 is changed to that indicated in FIG. 28, is indicated in FIGS. 33 and 36. In order to move the current concept to the concept displayed in the concept tree window, until the image indicated in FIG. 26 in changed to that indicated in FIG. 28, the processings in Steps 2410, 2420 and 2430 in FIG. 33 are effected and then the process proceeds to step 2700 in FIG. 36, as indicated by a joiner 2490. The processings in Steps 2710, 2720, 2730 and 2740 are effected one after another. Further the process proceeds to Step 2570 in FIG. 34, as indicated by a joiner 2561 and the processings in Steps 2580 and 2590 are effected. Finally the process returns to Step 2410 in FIG. 33 by a joiner 2460.

By clicking a series of letters of a concept in the query editing window, it is possible to move the current concept thereto and to change the concept or add a relation thereto. Here it is supposed that it is desired to examine articles concerning a query expression "COMPUTER developed by COMPANY located in JAPAN", which has been formed. In the query editing window 1902 in FIG. 28, the series of letters "COMPUTER" 1914 is clicked by means of the mouse so that the current concept is moved to "COMPUTER". FIG. 17 shows the image in this state. Since the current concept has been moved to "COMPUTER". The superconcept window 901 is rewritten to be changed to the superconcepts of "COMPUTER". In the query editing window 902 the pointer 909 is located at the series of letters "COMPUTER" 908 of the current concept. In the concept tree window 903 the anchor is made to be "HARDWARE", which is a superconcept of "COMPUTER" linked with the superconcept "ORGANIZATION" of "COMPANY" through the relation "DEVELOPMENT"; "HARDWARE" 904 and the following concepts are displayed in the form of a tree; and the pointer 911 is located at the series of letters "COMPUTER" 910. At this time it may be sufficient to display only "which is developed by COMPANY located in JAPAN" among the concepts following "HARDWARE". Or the number of the concepts satisfying "which is developed by COMPANY located in Japan" among the concepts following "HARDWARE" may be displayed. The flow of the processing, until the image indicated in FIG. 28 is changed to that indicated in FIG. 17, is indicated in FIG. 33 and 35. Until the image indicated in FIG. 28 is changed to that indicated in FIG. 17, since the current concept is moved to a concept in the query expression, the processings in Steps 2410 and 2420 in FIG. 33 are effected. Then the process proceeds to Step 2600 in FIG. 35, as indicated by a joiner 2480 and the processings in Steps 2601 and 2670 are effected. Further, as indicated by a joiner 2561, the process proceeds to Step 2570 in FIG. 34 and the processings in Steps 2580 and 2590 are effected. Finally the process returns to Step 2410 by a joiner 2460.

Figure 29:
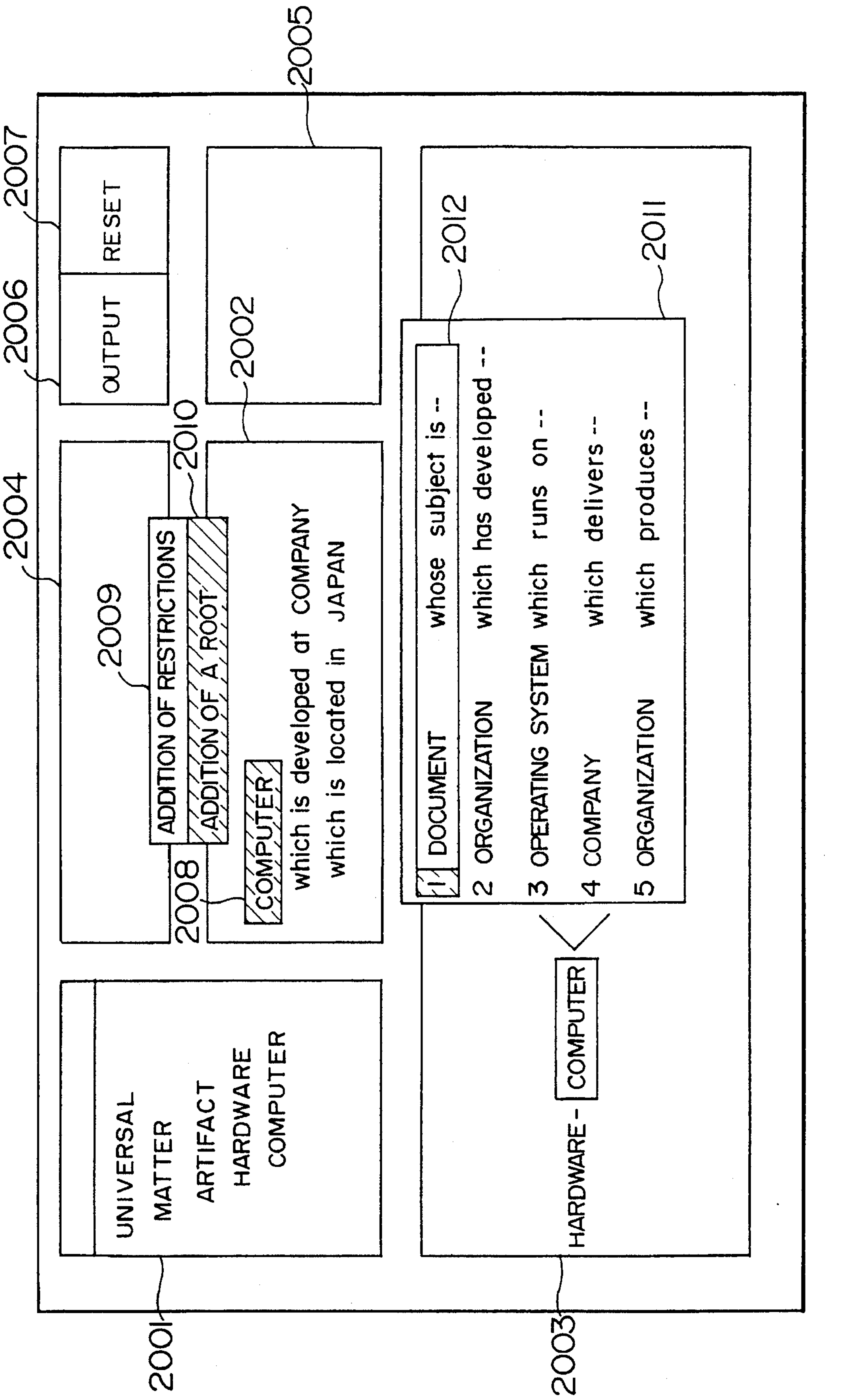
Figure 30:
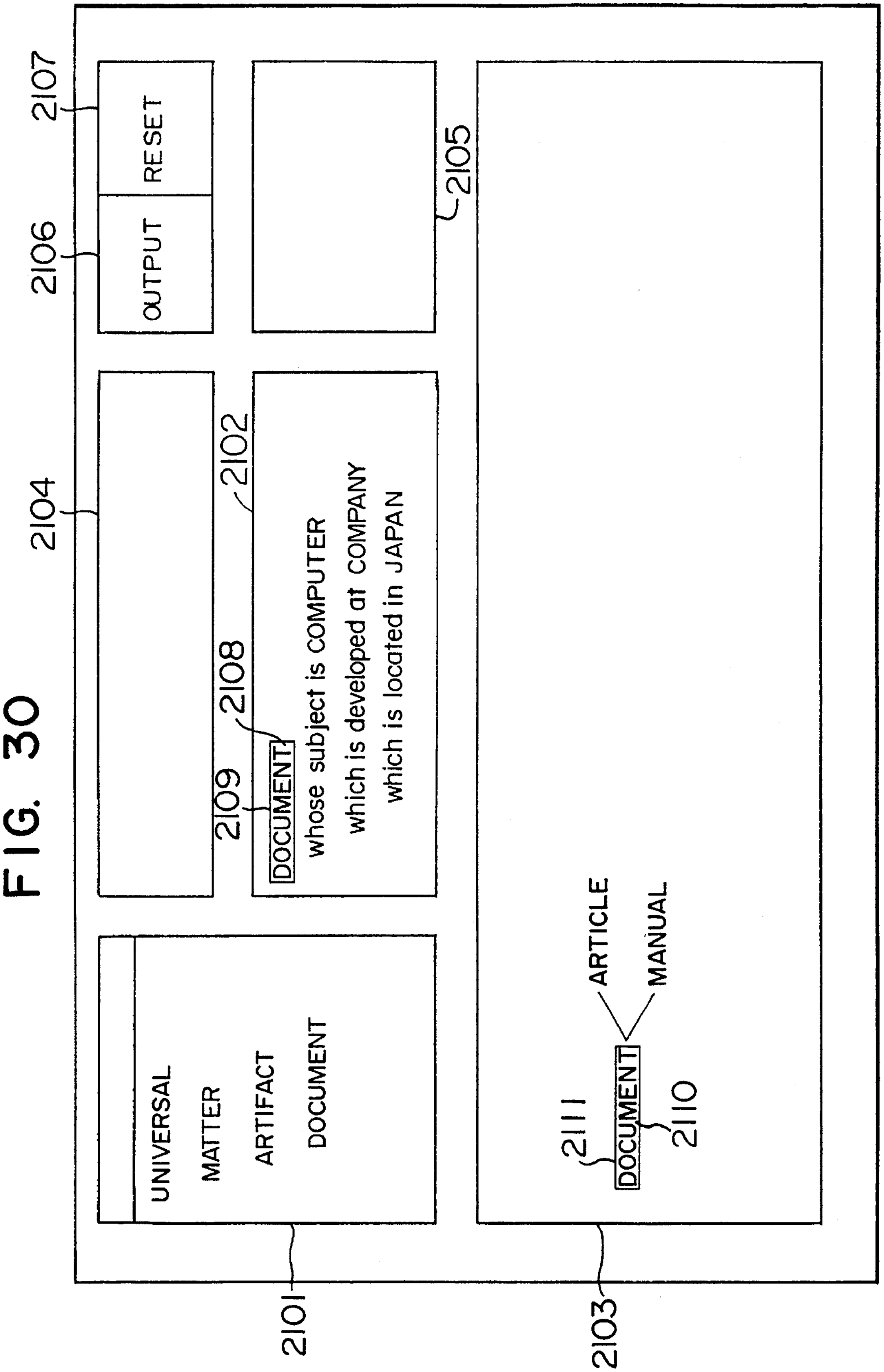

FIG. 29 indicates a process for adding a root to the concept "COMPUTER". When the series of letters "COMPUTER" 2008 is clicked in the query editing window 2002 by means of the mouse, a pop-up menu 2009 appears. At this time, when "addition of a root" 2010 is selected, a menu 2011 of generic relationships, which can be added to "COMPUTER" as a root, is displayed. At this time, if a relation item "DOCUMENT, whose SUBJECT is COMPUTER," 2012 is selected, the relevant relation is added to the query expression and the current concept is moved to a subconcept "DOCUMENT" in the relation item "DOCUMENT, whose SUBJECT is COMPUTER,". FIG. 30 shows an image in this state. Since the current concept has been moved to the concept "DOCUMENT", the superconcept window 2101 is rewritten to be changed to the superconcepts of "DOCUMENT". In the query editing window 2102 the pointer 2109 is located at the series of letters "DOCUMENT" 2108 of the current concept. In the concept tree window 2103 the anchor is made to be "DOCUMENT" connected with "COMPUTER" through the relation "SUBJECT"; "DOCUMENT" 2111 and the following concepts are displayed in the form of a tree; and the pointer 2111 is located at the series of letters "DOCUMENT" 2110. The flow of the processings until the image indicated in FIG. 29 is changed to that indicated in FIG. 30 is indicated in FIGS. 33 and 35. Until the image indicated in FIG. 29 is changed to that indicated in FIG. 30, the processings in Steps 2410 and 2420 in FIG. 33 are effected and as indicated by a joiner 2480, the process proceeds to step 2600 in FIG. 35. The processings in Steps 2610, 2620, 2621, 2622, 2623, 2624, 2625 and 2670 are effected one after another. Further, as indicated by a joiner 2561, the process proceeds to Step 2570 in FIG. 34 and the processings in Steps 2580 and 2590 are effected. Finally the process returns to Step 2410 in FIG. 33 by a joiner 2460.

Figure 31:
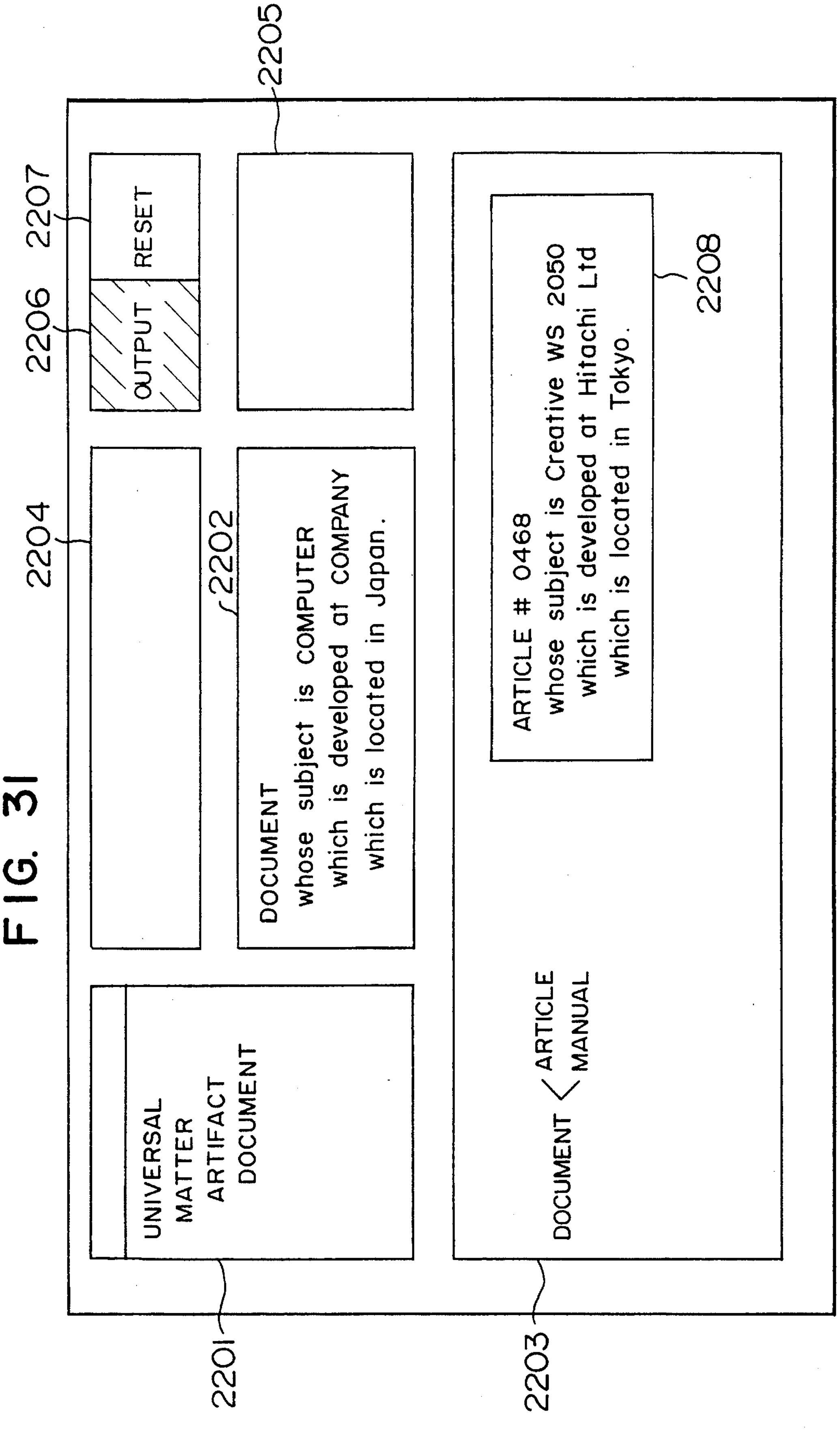

FIG. 31 is an output of the result corresponding to "DOCUMENT, whose subject is COMPUTER developed at COMPANY located in JAPAN.". This is made possible by clicking the command menu for retrieval output 2206 by means of the mouse, when the current concept is "DOCUMENT". The retrieval output is displayed by the pop-up menu 2208. The flow of the processing at this time is indicated in FIG. 33. The processings in Steps 2410, 2420, 2430, 2440 and 2441 in FIG. 33 are effected one after another and as indicated by the joiner 2460, the process returns to Step 2410 in FIG. 33.

Figure 32:
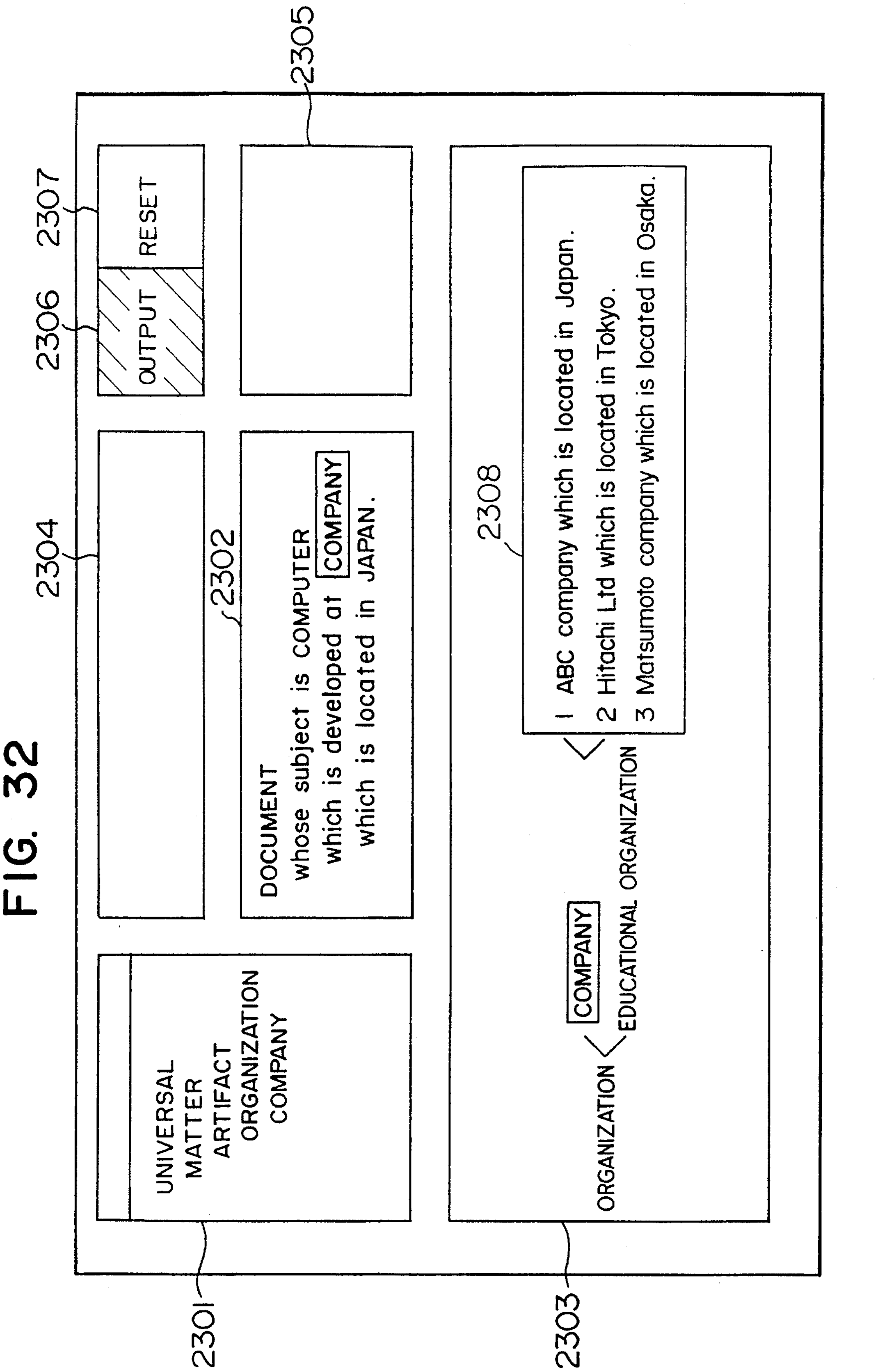

FIG. 32 shows the result obtained by carrying out the query for "COMPANY located in JAPAN". This is made possible by clicking the command menu for retrieval output 2306 by means of the mouse, when the current concept is "COMPANY". The query result is displayed by the pop-up menu 2308.

Although in order to facilitate understanding the explanation, in the above, the embodiments have been described by using concrete examples, the system according to this invention is not restricted to these concrete examples but various other functions can be added thereto. For example, the number of concepts satisfying conditions added every time the current concept is moved or the retrival output may be displayed.

Further only the concepts satisfying the imposed conditions may be displayed in the form of a concept tree made by subsumption relations.

Furthermore the concepts, which don't satisfy the conditions, in the concept tree made by subsumption relations may be displayed with a segment of line drawn over each of the series of letters thereof.

Further not only those described above, but also other concepts such as concrete relations attached to the current concept may be displayed successively.

Further the selection by means of a pop-up menu may be effected simultaneously for a plurality of concepts.

As explained above, according to this invention, since it is possible to change the concept in a query expression to form a final query expression, while looking multiple side information concerning a concept, to which attention is paid, it is possible to form a consistent query expression, by which a satisfactory query result can be obtained. Since the object of the query can be changed arbitrarily, the user is not restricted by the object of the query at the beginning thereof. Further, since the user can search information, while forming a query expression, the efficiency of the query can be increased remarkably. Furthermore, since a partial query of the query expression is possible, it is not necessary to form similar query expression repeatedly.

What is claimed is:

1. A knowledge based system for retrieving information by using a concept relation model which expresses knowledge by a plurality of interconnected nodes, each node represents a concept corresponding to information included in said node, said node being connected to other nodes by links, each of said links represents a relation between concepts represented by nodes connected by said link, comprising:

a first memory for storing concept names corresponding to said nodes, each concept name corresponds to a concept;

a second memory for storing information representing subsumption relations between different concepts corresponding to links connected between said concepts;

a third memory for storing information representing definitions of different kinds of relations;

a fourth memory for storing information representing relations between different concepts corresponding to links connected between said concepts; and relation deducting means for inputting a string of words from a user of said system and deducting both concept names and relations between concepts from said inputted string of words by using knowledge stored in said first to fourth memory; and retrieval means for retrieving information from at least one of said nodes based on said concept names and said relations between concepts deducted by said relation deducting means.

2. A knowledge base system for retrieving information by using a concept relation model which expresses knowledge y a plurality of interconnected nodes, each node represents a concept corresponding to information included in said node, said node being connected to other nodes by links, each of said links represents a relation between concepts represented by nodes connected by said link, comprising:

a first memory for storing concept names corresponding to said nodes, each concept name corresponds to a concept;

a second memory for storing information representing subsumption relations between different concepts corresponding to links connected between said concepts;

a third memory for storing information representing definitions of different kinds of relations;

a fourth memory for storing information representing relations between different concepts corresponding to links connected between said concepts; and relation deducting means for inputting concept names from a user of said system and deducting relations between concepts indicated by said inputted concept names by using knowledge stored in said first to fourth memory;

retrieval means for retrieving information from at least one of said nodes based on said inputted concept names and said relations deducted by said relation deducting means;

a fifth memory for storing syntax rules for understanding at least one natural language;

a sixth memory for storing a lexicon, which can be edited based on the content of said first and third memories;

lexical analysis means for effecting lexical analysis by inputting a sentence written in the natural language and referring to information coming from said sixth memory;

syntactic analysis means for forming possible sentence structures based on results of the lexical analysis and information stored in said fifth memory; and means for extracting and selecting only sentence structures appropriate in meaning relative to the inputted sentence formed based on a result of syntactic analysis by said relation deducting means.

3. A knowledge base system according to claim 2, wherein the inputted sentence written in the natural language consists of a series of nouns and said relation deducting means deducts the relation between different nouns constituting said series of nouns on the basis of an assembly of facts stored in a knowledge base described by the concepts and the relations.

4. A knowledge base system according to claim 2, wherein said syntactic analysis means outputs all the sentence structures, which are possible in view of the syntax rules as results of the syntactic analysis and deducts appropriateness in the meaning based on an assembly of facts stored in a knowledge base described by the concepts and the relations to select and output only those which are appropriate in the meaning, among the results of said syntactic analysis.

5. An information query system for querying desired information by using inputted abstract conceptual expressions expressed by combinations of concepts and relations between the concepts as querying conditions, comprising:

an input device for inputting an abstract conceptual expression as a query expression;

a dialogue window for displaying query expressions;

means for driving said dialogue window to display a network indicating mutual relation between different assemblies of concepts satisfying relations added to a current concept;

means for rewriting said dialogue window representing the network, responding to a modification of said dialogue window displaying query expressions, and rewriting the display of the query expression by replacing said concept by the current concept in the query expression, responding to a modification of the current concept to a certain concept displayed by said dialogue window displaying query expressions; and means for querying a database containing various types of information according to the rewritten network and the rewritten query expression.

6. An information query system according to claim 5, wherein said means for rewriting the display includes means for searching concepts connected by a generic relationship added to the current concept in the query expression among the concepts connected with the current concept through subsumption relationships, displaying the concepts belonging to the ranks not higher than the concepts of lowest rank in the subsumption relations among these concepts and moving said current concept to a concept within said domain of display.

7. An information query system according to claim 5, wherein said means for rewriting the display includes means for imposing conditions one after another to the concept in the query expression, the current concept moving freely among the concepts in the query expression.

8. An information query system according to claim 5, wherein said means for rewriting the display includes means for adding a root to the concept, which is the object to be queried in the query expression and modifying the concept, which is the object to be queried.

9. An information query system according to claim 5, wherein said means for rewriting the display includes means for making the query of the concepts, to which the condition is imposed, in the query expression, possible one after another.

10. A knowledge based file retrieval system, comprising:

a user interface which inputs from a user a series of words, analyzes said series of words, converts said series of words into an internal query condition based on information related to various concepts and displays responses from said system and information input by said user;

a knowledge base for storing knowledge including said concepts and relations among said concepts;

wherein said stored knowledge is represented by concept nodes and relation links forming a concept network, wherein each of said nodes represents a concept and each of said links represents a relation among said concepts;

information search means for identifying concept nodes that match said internal query condition semantically; and information retrieval means for retrieving at least one relevant file associated with said identified concept nodes.

11. A knowledge based file retrieval system according to claim 10 wherein said user interface permits said user to edit said internal query condition.

12. A knowledge based file retrieval system according to claim 11 wherein said user interface edits said internal query condition by adding or deleting conditions.

13. A knowledge based file retrieval system according to claim 10 wherein said user interface permits said user to edit said concept network.

14. A knowledge based file retrieval system according to claim 10 wherein said user interface edits said concept network by adding or deleting concept nodes.

15. A knowledge based file retrieval system according to claim 10 wherein said user interface implements operations through a multiwindow function.

16. A knowledge based file retrieval system according to claim 10 wherein said user interface displays said concept network in a hierarchial tree.

17. A knowledge based file retrieval system according to claim 10, wherein said information storage means stores files representing documents;

wherein said concept nodes represent said documents; and wherein said information retrieval means retrieves documents associated with said identified concept nodes.

18. A knowledge based file retrieval system according to claim 11, wherein said information storage means stores files representing documents;

wherein said concept nodes represent said documents; and wherein said information retrieval means retrieves documents associated with said identified concept nodes.

19. A document based file retrieval system according to claim 17 wherein said user interface permits said user to browse documents associated with said identified concept nodes.

20. A document based file retrieval system according to claim 18 wherein said user interface permits said user to browse documents associated with said identified concept nodes.

21. A knowledge based document retrieval system, comprising:

a user interface which inputs from a user a series of words, creates a query expression and an internal query condition from a dialogue, including said inputted series of words, resulting from interaction by said user with said system, said query expression and said internal query condition being created based on information related to various concepts, and displays responses from said system and information input by said user;

a knowledge base for storing knowledge including said concepts and relations among said concepts, wherein said stored knowledge is represented by concept nodes and relation links forming a concept network, wherein each of said nodes represents a concept and each of said links represents a relation among said concepts;

information search means for identifying concept nodes that match said internal query condition semantically; and information retrieval means for retrieving at least one document associated with said identified concept nodes.

22. A knowledge based document retrieval system according to claim 21, wherein said user interface permits said user to edit said internal query condition.

23. A knowledge based document retrieval system according to claim 22, wherein said user interface edits said internal query condition by adding or deleting conditions.

24. A knowledge based document retrieval system according to claim 21, wherein said user interface permits said user to edit said concept network.

25. A knowledge based document retrieval system according to claim 24, wherein said user interface edits said concept network by adding or deleting concept nodes.

26. A knowledge based document retrieval system according to claim 11, wherein said user interface displays said concept network as a hierarchial tree.

27. A document retrieval system according to claim 21, wherein each of said documents are included within a file which are retrieved by said information retrieval means.

28. A knowledge based document retrieval system according to claim 21, wherein said user interface permits a user to browse said at least one document associated with said identified concept nodes.

29. A knowledge based document retrieval system according to claim 21 wherein said user interface implements operations through a multi-window function.

30. A knowledge based document retrieval system, comprising:

a user interface which inputs from a user a series of words, creates an internal query condition based on said series of words and displays responses from said system and information input by said user;

a knowledge base for storing knowledge including concepts and relations among said concepts, wherein said stored knowledge is represented by concept nodes and relation links forming a concept network, wherein each of said nodes represents a concept and each of said links represents a relation among said concepts;

information storage means for storing said knowledge base and documents, wherein each document is associated with at least one concept node defined in said knowledge base;

information search means for identifying concept nodes that match said internal query condition represented in terms of concepts and relations defined in said knowledge base; and information retrieval means for retrieving documents from said information storage means associated with said identified concept nodes.

31. A knowledge based document retrieval system according to claim 30 wherein said user interface permits said user to edit said internal query condition.

32. A knowledge based document retrieval system according to claim 31, wherein said user interface edits said internal query condition by adding or deleting conditions.

33. A knowledge based document retrieval system according to claim 30, wherein said user interface permits said user to edit said concept network.

34. A knowledge based document retrieval system according to claim 33, wherein said user interface edits said concept network by adding or deleting concept nodes.

35. A knowledge based document retrieval system according to claim 30, wherein said user interface displays said concept network as a hierarchial tree.

36. A knowledge based document retrieval system according to claim 30, wherein said user interface implements operations through a multi-window function.

37. A knowledge based document retrieval system according to claim 30, wherein each of said documents are included within a file which are retrieved by said information retrieval means.

38. A knowledge based document retrieval system according to claim 30, wherein said user interface permits said user to browse said documents associated with said identified concept nodes.

* * * * *